United States Patent
Shin

(10) Patent No.: US 11,520,200 B2
(45) Date of Patent: Dec. 6, 2022

(54) DISPLAY DEVICE AND METHOD OF MANUFACTURING THE SAME

(71) Applicant: SAMSUNG DISPLAY CO., LTD., Yongin-si (KR)

(72) Inventor: Dong Hee Shin, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 122 days.

(21) Appl. No.: 16/828,074

(22) Filed: Mar. 24, 2020

(65) Prior Publication Data

US 2020/0348573 A1 Nov. 5, 2020

(30) Foreign Application Priority Data

May 3, 2019 (KR) .................... 10-2019-0052172

(51) Int. Cl.
*G02F 1/1362* (2006.01)
*G02F 1/1345* (2006.01)
*G09G 3/36* (2006.01)

(52) U.S. Cl.
CPC .... *G02F 1/136286* (2013.01); *G02F 1/13458* (2013.01); *G09G 3/3688* (2013.01)

(58) Field of Classification Search
CPC .......................... H05K 2201/05; H05K 1/147; G02F 1/13456; G02F 1/13306; G02F 1/13452; G02F 1/13458; G02F 1/136286; G09G 2300/0426; G09G 3/3688
See application file for complete search history.

(56) References Cited

U.S. PATENT DOCUMENTS

| 10,102,813 | B2 | 10/2018 | Heo et al. | |
| 2007/0008689 | A1 | 1/2007 | Park | |
| 2008/0251787 | A1* | 10/2008 | Kim | H01L 22/32 257/48 |
| 2016/0300545 | A1* | 10/2016 | Kim | G09G 3/006 |
| 2019/0189058 | A1* | 6/2019 | Cho | G09G 3/3258 |

FOREIGN PATENT DOCUMENTS

| KR | 10-0736395 | 7/2007 |
| KR | 10-1269289 | 5/2013 |
| KR | 10-1682363 | 12/2016 |
| KR | 10-2017-0080002 | 7/2017 |

* cited by examiner

*Primary Examiner* — Mariam Qureshi
(74) *Attorney, Agent, or Firm* — F. Chau & Associates, LLC

(57) ABSTRACT

A display device includes a substrate; and a driving pad disposed on the substrate, wherein the driving pad includes a first pad portion and a second pad portion alternately arranged along a direction, wherein each of the first pad portion and the second pad portion includes first data pads and signal pads, wherein the first data pads of the first and second pad portions include a first side and a second side different from the first side, wherein the signal pads of the first pad portion are disposed on the first side of the first data pads of the first pad portion, and the signal pads of the second pad portion are disposed on the second side of the first data pads of the second pad portion, and wherein the first data pads provide a data signal to pixels, and the signal pads provide a driving voltage to the pixels.

15 Claims, 14 Drawing Sheets

DISPLAY DEVICE AND METHOD OF MANUFACTURING THE SAME

CROSS-REFERENCE TO RELATED APPLICATION

The application claims priority under 35 U.S.C. § 119 to Korean Patent Application No. 10-2019-0052172, filed on May 3, 2019, the disclosure of which is incorporated by reference herein in its entirety.

TECHNICAL FIELD

The present invention relates to a display device and a method of manufacturing the same, and more particularly, to a display device including a pad electrode and a conductive film connected thereto, and a method of manufacturing the same.

DISCUSSION OF THE RELATED ART

As information becomes more widely dispersed throughout society, display devices for displaying images and information are becoming increasingly desirable. For example, display devices are being applied to a variety of electronic devices such as smartphones, digital cameras, notebook computers, navigations, and smart televisions. The display device may be a flat-panel display device such as a liquid crystal display (LCD) device, a field emission display (FED) device, and an organic light emitting display (OLED) device.

Generally, the display device may include a plurality of pixels for displaying an image and a display driver for controlling the pixels. In the case of the display driver, the display driver may be generally manufactured in the form of a chip, and may be mounted on the display device in the form of a chip on film (COF).

SUMMARY

According to an exemplary embodiment of the present inventive concept, a display device includes a first substrate including a plurality of pixels; and a driving pad disposed on the first substrate, wherein the driving pad includes a first pad portion and a second pad portion alternately arranged along a first direction, wherein each of the first pad portion and the second pad portion includes first data pads and signal pads, wherein the first data pads of the first and second pad portions include a first side and a second side different from the first side, wherein the signal pads of the first pad portion are disposed on the first side of the first data pads of the first pad portion, and the signal pads of the second pad portion are disposed on the second side of the first data pads of the second pad portion, and wherein the first data pads provide a data signal to the plurality of pixels, and the signal pads provide a driving voltage to the plurality of pixels.

In an exemplary embodiment of the present inventive concept, a plurality of bonding regions are provided in the first substrate, wherein the driving pad is disposed on the plurality of bonding regions, wherein each of the plurality of bonding regions includes a data region and a signal region, wherein the signal pads are arranged in the signal region, wherein the first data pads are arranged in the data region, and wherein an area of the data region is larger than that of the signal region.

In an exemplary embodiment of the present inventive concept, each of the first pad portion and the second pad portion further includes second data pads, wherein the data region includes a first row data region and a second row data region arranged along a second direction intersecting the first direction, and wherein the first data pads are arranged in the first row data region, and the second data pads are arranged in the second row data region.

In an exemplary embodiment of the present inventive concept, the first pad portion and the second pad portion form one pad pair, a shape of the first pad portion and a shape of the second pad portion are symmetrical to each other with respect to a line extending in the second direction therebetween, and the driving pad includes a plurality of pad pairs arranged along the first direction.

In an exemplary embodiment of the present inventive concept, the signal pads of the first pad portion or the signal pads of the second pad portion provide a gate signal to the plurality of pixels.

In an exemplary embodiment of the present inventive concept, the driving voltage is at least one of a common voltage, a storage voltage, or a dividing reference voltage.

In an exemplary embodiment of the present inventive concept, the display device further includes: a driving film electrically coupled to the driving pad, wherein the driving film includes a flexible film and a source driving circuit disposed on the flexible film.

In an exemplary embodiment of the present inventive concept, the driving film includes a first driving film portion and a second driving film portion alternately arranged along the first direction, and wherein the first driving film portion is coupled to the first pad portion and the second driving film portion is coupled to the second pad portion.

In an exemplary embodiment of the present inventive concept, the first driving film portion includes a first lead portion, and the second driving film portion includes a second lead portion, wherein each of the first lead portion and the second lead portion includes first data leads and signal leads, wherein the first data leads of the first and second lead portions include a first side and a second side different from the first side, and wherein the signal leads of the first lead portion are disposed on only the first side of the first data leads of the first lead portion, and the signal leads of the second lead portion are disposed on only the second side of the first data leads of the second lead portion.

In an exemplary embodiment of the present inventive concept, the first data pads are electrically coupled to the first data leads to receive the data signal, and the signal pads are electrically coupled to the signal leads to receive the driving voltage.

In an exemplary embodiment of the present inventive concept, the signal leads of the first driving film portion or the signal leads of the second driving film portion receive the gate signal from the source driving circuit.

In an exemplary embodiment of the present inventive concept, the driving pad further includes a third pad portion disposed between the first pad portion and the second pad portion, and wherein the first pad portion, the second pad portion, and the third pad portion form one pad pair.

In an exemplary embodiment of the present inventive concept, the third pad portion includes the first data pads and does not include the signal pads.

In an exemplary embodiment of the present inventive concept, the third pad portion further includes the second data pads disposed in the second row data region.

In an exemplary embodiment of the present inventive concept, the display device further includes: a second substrate facing the first substrate; and a liquid crystal layer disposed between the first substrate and the second substrate.

In an exemplary embodiment of the present inventive concept, the signal region includes a first row signal region and a second row signal region arranged along the second direction, wherein the first row signal region overlaps the first row data region in the first direction, and the second row signal region overlaps the second row data region in the first direction, and wherein the signal pads are disposed in the first row signal region and are not disposed in the second row signal region.

According to an exemplary embodiment of the present inventive concept, a method of manufacturing a display device, the method including: exposing a first exposure region of a exposure mask; exposing a second exposure region of the exposure mask; and exposing a third exposure region of the exposure mask, wherein the exposure mask includes a first pad open region, a second pad open region, a third pad open region, and a fourth pad open region arranged along a first direction, wherein each of the first pad open region and the third pad open region includes a first pad slit portion, wherein each of the second pad open region and the fourth pad open region includes a second pad slit portion symmetrical to the first pad slit portion with respect to a line extending in a second direction, crossing the first direction, between the second pad slit portion and the first pad slit portion, wherein the first exposure region includes the first pad open region, the second pad open region, and the third pad open region, wherein the second exposure region includes the second pad open region and the third pad open region, and wherein the third exposure region includes the second pad open region, the third pad open region, and the fourth pad open region.

According to an exemplary embodiment of the present inventive concept, a display device including: a first substrate; and a driving pad disposed on the first substrate and including a first pad portion and a second pad portion alternately arranged along a first direction, wherein each of the first pad portion and the second pad portion includes a first pad region and a second pad region, wherein the first pad regions of the first and second pad portions include a first side and a second side opposite to the first side, wherein the second pad region of the first pad portion is disposed at the first side of the first pad region of the first pad portion, and the second pad region of the second pad portion is disposed at the second side of the first pad region of the second pad portion, and wherein each first pad region is wider than each second pad region.

In an exemplary embodiment of the present inventive concept, the each first pad region includes first pads, and each second pad region includes second pads, wherein the first pads are configured to provide a data signal to a plurality of pixels disposed on the first substrate, and the second pads are configured to provide a driving voltage to the plurality of pixels.

In an exemplary embodiment of the present inventive concept, the second pads are not disposed at the second side of the first pad region of the first pad portion and the first side of the first pad region of the second pad portion.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EMBODIMENTS

Figure 1:
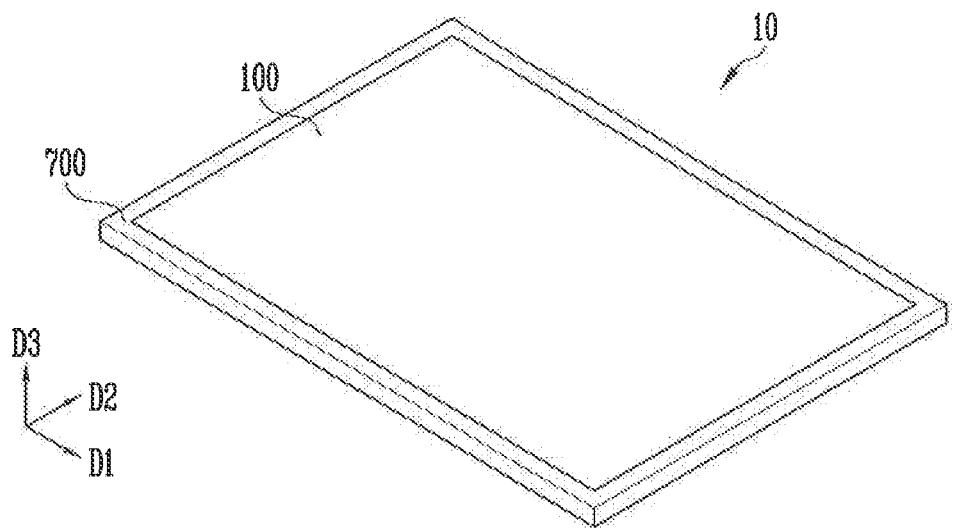
FIG. 1 is a perspective view of a display device according to an exemplary embodiment of the present invention.

Exemplary embodiments of the present invention will be described more fully hereinafter with reference to the accompanying drawings. However, the present invention is not limited to the following exemplary embodiments and may be implemented in various different forms.

It will be understood that when an element or layer is referred to as being "on" another element or layer, the element or layer may be directly on another element or layer or intervening elements or layers may be present. Like reference numerals may refer to like elements throughout the present specification, and thus repetitive descriptions may be omitted.

Although the terms first, second, etc. may be used herein to describe various components, these components should not be limited by these terms. These terms are only used to distinguish one component from another component. Thus, a first component discussed below could be termed a second component without departing from the spirit and scope of the present invention.

Hereinafter, exemplary embodiments of the present invention will be described in more detail with reference to the accompanying drawings.

Figure 2:
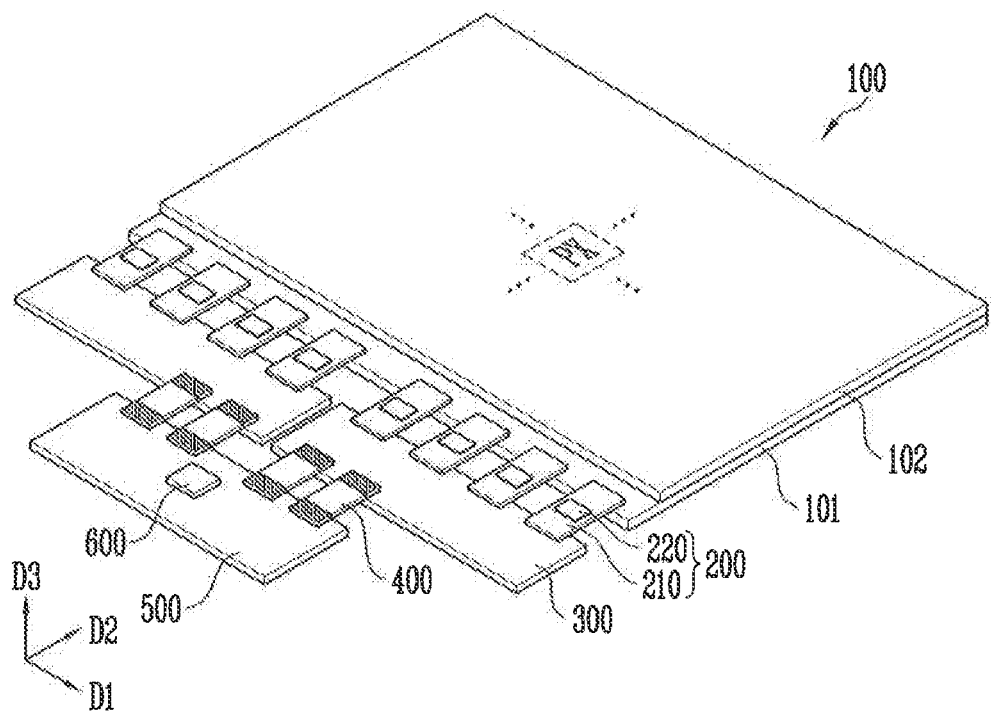
FIG. 2 is a perspective view of a display panel according to an exemplary embodiment of the present invention.

FIG. 1 is a perspective view of a display device according to an exemplary embodiment of the present invention. FIG. 2 is a perspective view of a display panel according to an exemplary embodiment of the present invention.

Referring to FIGS. 1 and 2, a display device 10 according to an exemplary embodiment of the present invention may include a display panel 100, driving films 200, source circuit boards 300, cables 400, a control circuit board 500, a timing control circuit 600, and a set cover 700. Each of the driving films 200 may include a flexible film 210 and a source driving circuit 220.

The set cover 700 may be disposed to surround the boundary of the display panel 100. The set cover 700 may cover a non-display region and not a display region of the display panel 100. The set cover 700 may include a top set cover that covers an edge of an upper surface of the display panel 100 and a bottom set cover that covers lower and side surfaces of the display panel 100. The top set cover and the bottom set cover may be coupled to each other by a fixing member such as a screw or an adhesive member such as double-sided tape or adhesive. The set cover 700 may be made of plastic and/or metal.

The display panel 100 may have a quadrangular shape in a plan view. For example, the display panel 100 may have a rectangular shape having a long side extending in a first direction D1 and a short side extending in a second direction D2 crossing the first direction D1 as shown in FIG. 2. A corner where the long side in the first direction D1 and the short side in the second direction D2 meet may be formed at about 90 degrees or may be rounded to have a predetermined curvature. A planar shape of the display panel 100 is not limited to a rectangle. For example, the display panel 100 may have a polygonal shape, a circular shape or an elliptical shape.

FIG. 2 shows an example in which the display panel 100 is flat, but the present invention is not limited thereto. The display panel 100 may be bent at a predetermined curvature.

The display panel 100 may include a first substrate 101 and a second substrate 102. The first substrate 101 and the second substrate 102 may be rigid or flexible. The first substrate 101 and the second substrate 102 may be formed of glass or plastic. The second substrate 102 may be disposed on the first substrate 101.

The display panel 100 may include a liquid crystal layer between the first substrate 101 and the second substrate 102 to control the light transmittance of the liquid crystal layer according to a driving signal applied to the display panel 100. Thus, the display panel 100 may display an image of a desired grayscale.

One end of each of the driving films 200 may be attached to one surface of the first substrate 101 of the display panel 100 and the other end of each of the driving films 200 may be attached to one surface of the source circuit board 300. For example, since the size of the first substrate 101 is larger than that of the second substrate 102, one side of the first substrate 101 may be exposed without being covered by the second substrate 102. The driving films 200 may be attached to the one side of the first substrate 101 exposed without being covered by the second substrate 102. Each of the driving films 200 may be attached to one surface of the first substrate 101 and one surface of the source circuit board 300 by using an anisotropic conductive film (ACF).

Each of the driving films 200 may be a structure of a chip on film. In addition, the driving films 200 may be bendable. For example, the driving films 200 may be bent to the lower surface of the first substrate 101. The source circuit boards 300, the cables 400 and the control circuit board 500 may be disposed on the lower surface of the first substrate 101 when the driving films 200 are bent.

FIG. 2 shows an example in which eight driving films (200) are attached on the first substrate 101 of the display panel 100. However, the number of driving films (200) is not limited thereto. For example, 24 driving films (200) may be attached to the first substrate 101.

Each of the driving films 200 may include the flexible film 210 and the source driving circuit 220. For example, the source driving circuit 220 may be disposed on one surface of the flexible film 210. The source driving circuit 220 may be formed of an integrated circuit (IC). The source driving circuit 220 may convert digital video data into analog data voltages in accordance with a source control signal of the timing control circuit 600 and supply the analog data voltages to data lines of the display panel 100 through the flexible film 210.

Each of the source circuit boards 300 may be coupled to the control circuit board 500 via the cables 400. The source circuit boards 300 may be a flexible printed circuit board (FPCB) or a printed circuit board (PCB). The cables 400 may be a flexible cable.

The control circuit board 500 may be coupled to the source circuit boards 300 via the cables 400. The control circuit board 500 may be an FPCB or a PCB.

FIG. 2 shows an example in which four cables (400) connect the source circuit boards 300 and the control circuit board 500. However, the number of cables (400) is not limited thereto. In addition, FIG. 2 shows two source circuit boards (300). However, the number of source circuit boards (300) is not limited thereto.

The timing control circuit 600 may be disposed on one surface of the control circuit board 500. For example, the timing control circuit 600 may be formed of an integrated circuit (IC). The timing control circuit 600 may receive timing signals such as digital video data and gate signals from a system-on-chip of a system circuit board, and may generate a source control signal for controlling the timing of the source driving circuit 220 according to the timing signals.

The system-on-chip may be mounted on a system circuit board that is coupled to the control circuit board 500 via another flexible cable, and may be formed of an integrated circuit. For example, the system-on-chip may be a processor of a smart TV, a central processing unit (CPU) or a graphics processing unit (GPU) of a computer or a notebook, or an application processor of a smartphone or tablet computer. The system circuit board may be a flexible printed circuit board or a printed circuit board.

A power supply circuit may be further attached to one surface of the control circuit board 500. The power supply circuit may generate voltages for driving the display panel 100 using a main power source supplied from the system circuit board and supply the voltages to the display panel 100. For example, the power supply circuit may generate a storage voltage, a common voltage, and a reference voltage for driving a liquid crystal display device and supply the same to the display panel 100. In addition, the power supply circuit may generate and supply driving voltages for driving the source driving circuit 220, the timing control circuit 600, and the like. The power supply circuit may be formed of an integrated circuit. In addition, the power supply circuit may be disposed on a power supply circuit board formed separately from the control circuit board 500. The power supply circuit board may be a flexible printed circuit board or a printed circuit board.

FIGS. 1 and 2 show an example of the medium or large-sized display device 10 including a plurality of source driving circuits 220. However, the present invention is not limited thereto. In an exemplary embodiment of the present invention, the display device 10 may be a small-sized display device including one source driving circuit 220. In this case, the driving films 200, the source circuit boards 300, and the cables 400 may be omitted. In addition, the source driving circuit 220 and the timing control circuit 600 may be integrated into one integrated circuit and bonded on one flexible circuit board connected to the first substrate 101, or the source driving circuit 220 and the timing control circuit 600 may be adhered to the first substrate 101 of the display panel 100. Examples of the medium or large-sized display device may include monitors and televisions, and examples of the small-sized display device may include smartphones and tablet computers.

Figure 3:
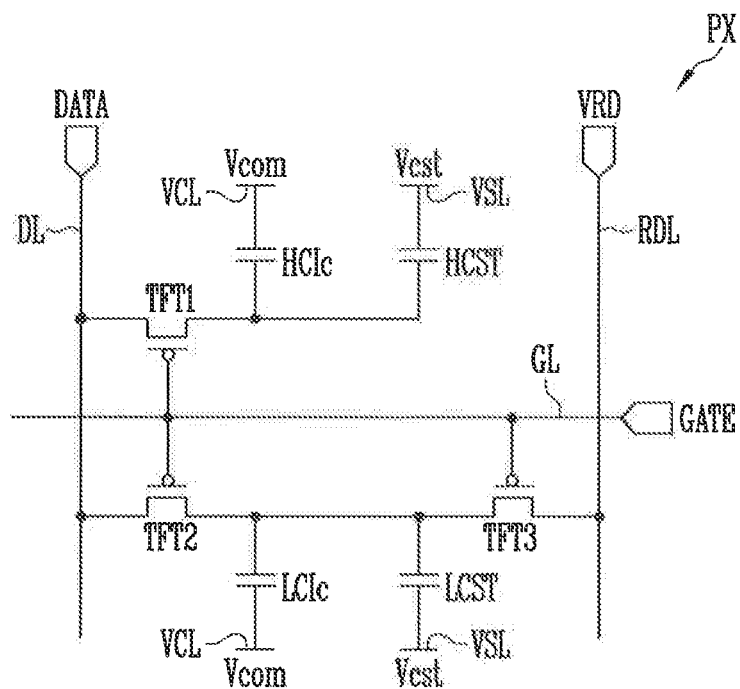
FIG. 3 is a circuit diagram illustrating a pixel shown in FIG. 2.

FIG. 3 is a circuit diagram illustrating a pixel shown in FIG. 2.

Referring to FIG. 3, a pixel PX of the display panel may include a plurality of signal lines and a first thin film transistor TFT1, a second thin film transistor TFT2, a third thin film transistor TFT3, a high liquid crystal capacitor HClc, a low liquid crystal capacitor LClc, a high storage capacitor HCST, and a low storage capacitor LCST which are electrically coupled to the plurality of signal lines.

The signal lines may include a gate line GL, a data line DL, and a dividing reference voltage line RDL A gate signal GATE may be applied to the gate line GL, a data signal DATA may be applied to the data line DL, and a dividing reference voltage VRD may be supplied to the dividing reference voltage line RDL.

A common voltage Vcom may be supplied to a common electrode VCL, and the high liquid crystal capacitor HClc may be formed between the common electrode VCL and one electrode of the first thin film transistor TFT1. The low liquid crystal capacitor LClc may be formed between the common electrode VCL and one electrode of the second thin film transistor TFT2.

A storage voltage Vcst may be applied to a storage electrode VSL, and the high storage capacitor HCST may be formed between the storage electrode VSL and one electrode of the first thin film transistor TFT1. The low storage capacitor LCST may be formed between the storage electrode VSL and one electrode of the second thin film transistor TFT2.

When the gate signal GATE is applied to the gate line GL, the first thin film transistor TFT1, the second thin film transistor TFT2, and the third thin film transistor TFT3 may be turned on. Accordingly, a data voltage (e.g., of the data signal DATA) applied to the data line DL may be applied to the high liquid crystal capacitor HClc through the first thin film transistor TFT1 when it is turned on. At this time, the high liquid crystal capacitor HClc may be charged with a voltage corresponding to the difference between the common voltage Vcom applied to the common electrode VCL and the data voltage. At the same time, the data voltage may be transmitted to the second thin film transistor TFT2, when it is turned on, and the third thin film transistor TFT3, when it is turned on. In addition, the low liquid crystal capacitor LClc may be charged with the data voltage. The voltage charged in the low liquid crystal capacitor LClc may be lower than that in the high liquid crystal capacitor HClc.

For example, the data voltage that has passed through the first thin film transistor TFT1 may be entirely charged to the high liquid crystal capacitor HClc, but the data voltage that has passed through the second thin film transistor TFT2 may be partially charged to the low liquid crystal capacitor LClc due to the third thin film transistor TFT3. Therefore, the luminance of a region where the high liquid crystal capacitor HClc is located is higher than that of a region where the low liquid crystal capacitor LClc is located.

The display device including the pixel PX according to the present embodiment may adjust the voltages charged to the high liquid crystal capacitor HClc and the low liquid crystal capacitor LClc so that the image viewed from the side is as close as possible to the image viewed from the front. As a result, side visibility may be increased.

Figure 4:
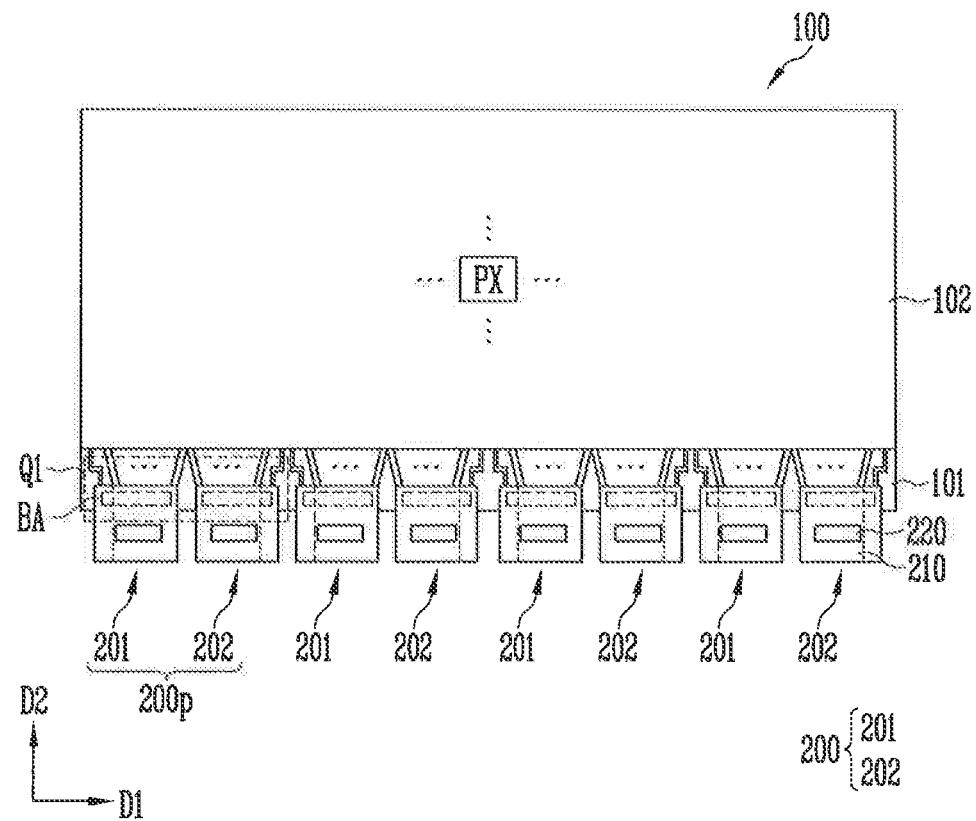
FIG. 4 is a plan view illustrating the display panel of FIG. 2.

FIG. 4 is a plan view illustrating the display panel of FIG. 2. For the sake of convenience of explanation, unlike FIG. 2, the source circuit board 300, the cables 400, the control circuit board 500, and the timing control circuit 600 may be omitted and the first substrate 101, the second substrate 102, and the driving films 200 may be illustrated in FIG. 4.

Referring to FIG. 4, the display panel 100 may include the first substrate 101, the second substrate 102, and the driving films 200 attached to one side of the first substrate 101.

As described above, each of the driving films 200 may include the flexible film 210 and the source driving circuit 220 disposed on one surface of the flexible film 210. The source driving circuit 220 may supply various driving signals and a driving power (e.g., a voltage) for driving the display device, and the driving signals and the driving power may be supplied to the pixels PX in the display panel 100 through the flexible film 210.

The first substrate 101 may include signal lines for transmitting the driving signals and the driving power provided from the driving films 200 to electrodes inside the display panel 100.

A region, on the first substrate 101, where each of the driving films 200 is attached to may be a bonding region BA. The flexible film 210 may be in contact with the first substrate 101 at the bonding region BA to transmit the driving signals and the driving power for driving the display device. For example, the first substrate 101 may include a plurality of bonding regions BA. The plurality of bonding regions BA may be arranged adjacent to one side of the first substrate 101 in the first direction D.

In addition, the driving films 200 may include a plurality of first driving film portions 201 and a plurality of second driving film portions 202. As shown in FIG. 4, the first driving film portions 201 and the second driving film portions 202 may be alternately arranged along the first direction D1.

The driving films 200 may include a plurality of film pairs 200p. One film pair 200p may be include the first driving film portion 201 and the second driving film portion 202 which are sequentially arranged. The plurality of film pairs 200p may be arranged along the first direction D1.

Hereinafter, a driving pad 110 of the first substrate 101 and the driving films 200 connected thereto will be described in detail with reference to FIGS. 5 to 8.

Figure 5:
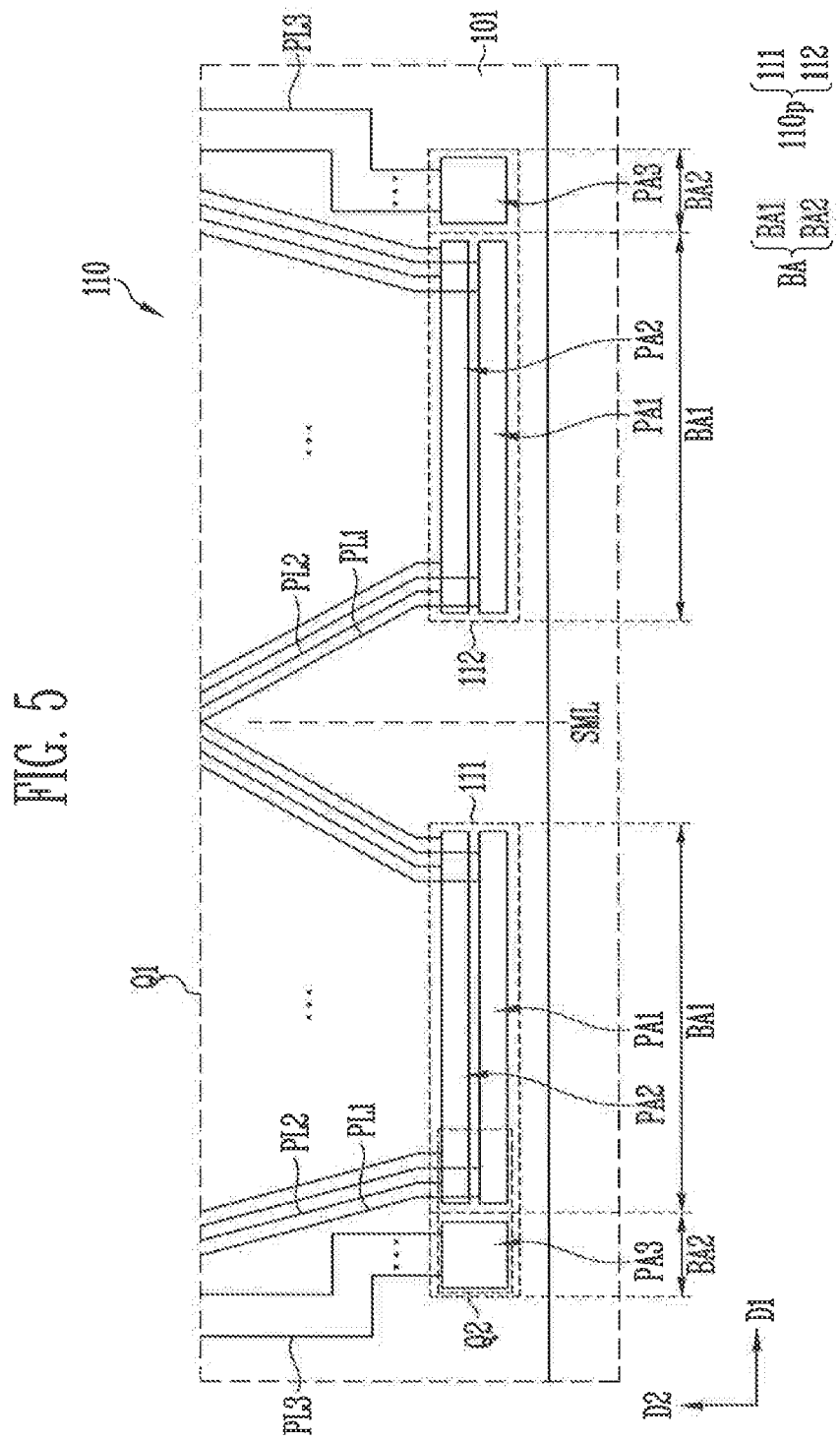
FIG. 5 is an enlarged plan view of the display panel in which a region Q1 in FIG. 4 is enlarged.
Figure 6:
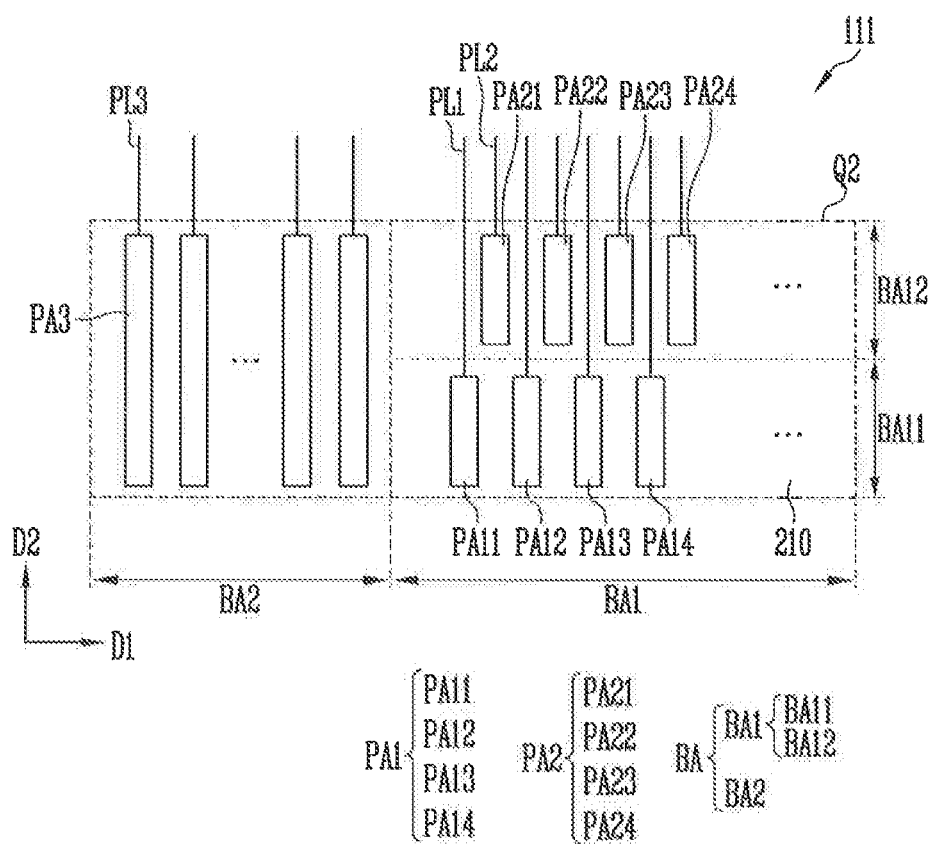
FIG. 6 is an enlarged plan view of a region Q2 in FIG. 5.

FIG. 5 is an enlarged plan view of the display panel in which a region Q1 in FIG. 4 is enlarged. FIG. 6 is an enlarged plan view of a region Q2 in FIG. 5. For example, FIG. 5 shows a first pad portion 111 and a second pad portion 112 of the first substrate 101. FIG. 6 shows a first data pad PA1, a second data pad PA2, and a signal pad PA3 of the first pad portion 111. FIGS. 5 and 6 show only the first substrate 101 without the driving films for convenience of explanation.

Referring FIGS. 3, 4, 5 and 6, the driving pad 110 and various signal lines PL1, PL2 and PL3 electrically coupled to the driving pad 110 may be formed on one side surface of the first substrate 101.

The driving pad 110 may include the first pad portion 111 and the second pad portion 112. As described above, the first pad portion 111 and the second pad portion 12 may be alternately arranged along the first direction D1.

The driving pad 110 may include a plurality of pad pairs 110p. One pad pair 110p may include the first pad portion 111 and the second pad portion 112 which are sequentially arranged, and the plurality of pad pairs 110*p* may be arranged along the first direction D1.

The first pad portion 111 and the second pad portion 112 may be symmetrical to each other with respect to a symmetry line SML therebetween. Accordingly, the signal lines PL1, PL2, and PL3 connected to the first and second pad portions 111 and 112 may be formed in a symmetrical shape. For example, the signal lines PL1, PL2, PL3 connected to the first pad portion 111 may be symmetrical to the signal lines PL1, PL2, PL3 connected to the second pad portion 112 with respect to the symmetry line SML.

The first pad portion 111 and the second pad portion 112 may be formed in the bonding region BA. The bonding region BA may be connected to the driving film 200 as described above. The bonding region BA may include a data region BA1 and a signal region BA2. According to an exemplary embodiment of the present invention, the bonding region BA may include either the data region BA1 or the signal region BA2.

The area of the data region BA1 may be wider than that of the signal region BA2. For example, the widths of the data region BA1 and the signal region BA2 in the first direction D1 may be different from each other, and the widths thereof in the second direction D2 may be substantially equal to each other. For example, the width of the data region BA1 in the first direction D1 may be wider than that of the signal region BA2 in the first direction D1.

The data region BA1 and the signal region BA2 may be regions transmitting different signals. For example, the data region BA1 may be a region to which the data signal DATA is transmitted and the signal region BA2 may be a region to which the gate signal GATE and various driving voltages VRD, Vcst and Vcom other than the data signal DATA are transmitted. The types of signals transmitted through the bonding regions BA1 and BA2 are not limited thereto.

Each of the first pad portion 111 and the second pad portion 112 may include a plurality of first data pads PA, a plurality of second data pads PA2, and a plurality of third pads PA3. The first data pads PA1 and the second data pads PA2 may be disposed in the data region BA1 and the third pads (e.g., signal pads) PA3 may be disposed in the signal region BA2.

As shown in FIG. 6, the first data pads PA1 may include first, second, third and fourth pads PA11, PA12, PA13 and PA14. The first, second, third and fourth pads PA11, PA12, PA13 and PA14 may be arranged along the first direction D1. The second data pads PA2 may include fifth, sixth, seventh and eighth pads PA21, PA22, PA23 and PA24. The fifth, sixth, seventh and eighth pads PA21, PA22, PA23 and PA24 may be arranged along the first direction D. For example, the first data pads PA1 and the second data pads PA2 may each include pad rows. The pad rows of the first data pads PA1 and the pad rows of the second data pads PA2 may be spaced apart from each other in the second direction D2.

The data region BA1 may be divided into a first row data region BA11 and a second row data region BA12 along the second direction D2. The first data pads PA1 may be arranged in the first row data region BA11 of the data region BA1 and the second data pads PA2 may be arranged in the second row data region BA12 of the data region BA1.

The first data pads PA1 and the second data pads PA2 may not overlap each other in the second direction D2. For example, the first data pads PA1 and the second data pads PA2 may be arranged to be staggered from each other. For example, in the first direction D1, the second pad PA12 of the first data pad PA may be disposed between the fifth pad PA21 and the sixth pad PA22 adjacent thereto of the second data pad PA2. For example, the pads PA11, PA12, PA13 and PA14 of the first data pad PA1 and the pads PA21, PA22, PA23 and PA24 of the second data pad PA2 may be alternately arranged along the first direction D1.

The signal pad PA3 may be repeatedly arranged in the signal region BA2 along the first direction D1. The signal region BA2 may be adjacent to the data region BA1 in the first direction D1 or an opposite direction to the first direction D1. For example, the signal region BA2 may be located on the left or right side of the data region BA1 on the plane. In an exemplary embodiment of the present invention, the signal region BA2 of the first pad portion 111 may be located on the left side of the data region BA1 and the signal region BA2 of the second pad portion 112 may be located on the right side of the data region BA1.

The signal lines PL1, PL2, and PL3 may be formed on the first substrate 101. The signal lines PL1, PL2 and PL3 may receive the driving signals and the driving power from the first data pads PA1, the second data pads PA2, and the signal pad PA3, respectively, and may transmit the received driving signals and the received driving power to the pixels PX. For example, the first signal lines PL1 may be coupled to the first data pads PA1, the second signal lines PL2 may be coupled to the second data pads PA2, and the third signal lines PL3 may be coupled to the signal pads PA3. Each of the pads PA1, PA2 and PA3 and each of the signal lines PL1, PL2 and PL3 may be connected to correspond to each other. However, according to an exemplary embodiment of the present inventive concept, some pads may be arranged as dummy pads that are not coupled to the signal lines.

The signals transmitted by the signal lines PL1, PL2, and PL3 may be different from each other. In an exemplary embodiment of the present inventive concept, the first data pads PA1 and the second data pads PA2 may receive the data signal DATA from the driving film 200. The first signal line PL1 and the second signal line PL2 may be coupled to the data line DL to transmit the data signal DATA to each pixel PX. In addition, the signal pad PA3 may receive signals other than the data signal DATA from the driving film 200. For example, the signal pad PA3 may be provided with the gate signal GATE and a driving power. The driving power provided to the signal pad PA3 may include at least one of the dividing reference voltage VRD, the storage voltage Vcst, and/or the common voltage Vcom. For example, the third signal lines PL3 may be coupled to the gate line GL, the dividing reference voltage line RDL, the common electrode VCL and the storage electrodes VSL to transmit the driving signals and the driving power sources to each of the pixels PX. The driving signals and the driving power transmitted by each of the signal lines PL1, PL2, and PL3 are not limited to those described above, and other types of signals may be transmitted.

The gate signal GATE provided by the driving film 200 may be transmitted to a part of the signal pads PA3. In an exemplary embodiment of the present invention, the gate signal GATE may be transmitted only to the outermost pad portion of the driving pad 110 formed on the first substrate 101. For example, the signal pad PA3 of the leftmost first pad portion 111 of the driving pad 110 and the signal pad PA3 of the rightmost second pad portion 112 of the driving pad 110 may be provided with the gate signal GATE, and the other signal pads PA3 may be provided with the driving power VRD. Vcom and Vcst other than the data signal DATA and the gate signal GATE.

As described above, the driving pad 110 may be formed on one side of the first substrate 101, and the driving pad 110 may include a plurality of first pad portions (111) and a plurality of second pad portions (112) alternately arranged. The first pad portion 111 and the second pad portion 112 may be symmetrical to each other, with respect to the symmetry line SML, and constitute one pad pair 110p. When the first pad portion 111 and the second pad portion 112 constitute the pad pair 110p, even if the size of a mask used in an exposure process for forming the driving pad 110 is smaller than the size of the driving pad 110, the full-size driving pad 110 may be formed by repeating the exposure process a plurality of times.

Each of the first pad portion 111 and the second pad portion 112 may include the pads PA1, PA2 and PA3 disposed in the data region BA1 and the signal region BA2, and receive different signals from the driving films 200. For example, the first pad portion 11 may include the first data pads PA1 and the second data pads PA2 disposed in the data region BA1 to receive the data signal DATA. The first pad portion 11 may further include the signal pad PA3 disposed in the signal region BA2 to receive various signals including the gate signal GATE, the dividing reference voltage VRD, the storage voltage Vcst and the common voltage Vcom.

Each of the various signal lines PL1, PL2 and PL3 formed on the first substrate 101 may be coupled to the driving pad 110 to transmit signals and voltages provided to the driving pad 110 to the pixels PX. The first signal lines PL1 and the second signal lines PL2 may be coupled to the first data pads PA1 and the second data pads PA2, respectively, to transmit the data signal DATA to the pixels PX, and the third signal line PL3 may be coupled to the signal pad PA3 to provide various signals including the gate signal GATE to the pixels PX.

Hereinafter, the driving films adhered to the above-described pad portion will be described in detail with reference to FIGS. 7 and 8.

Figure 7:
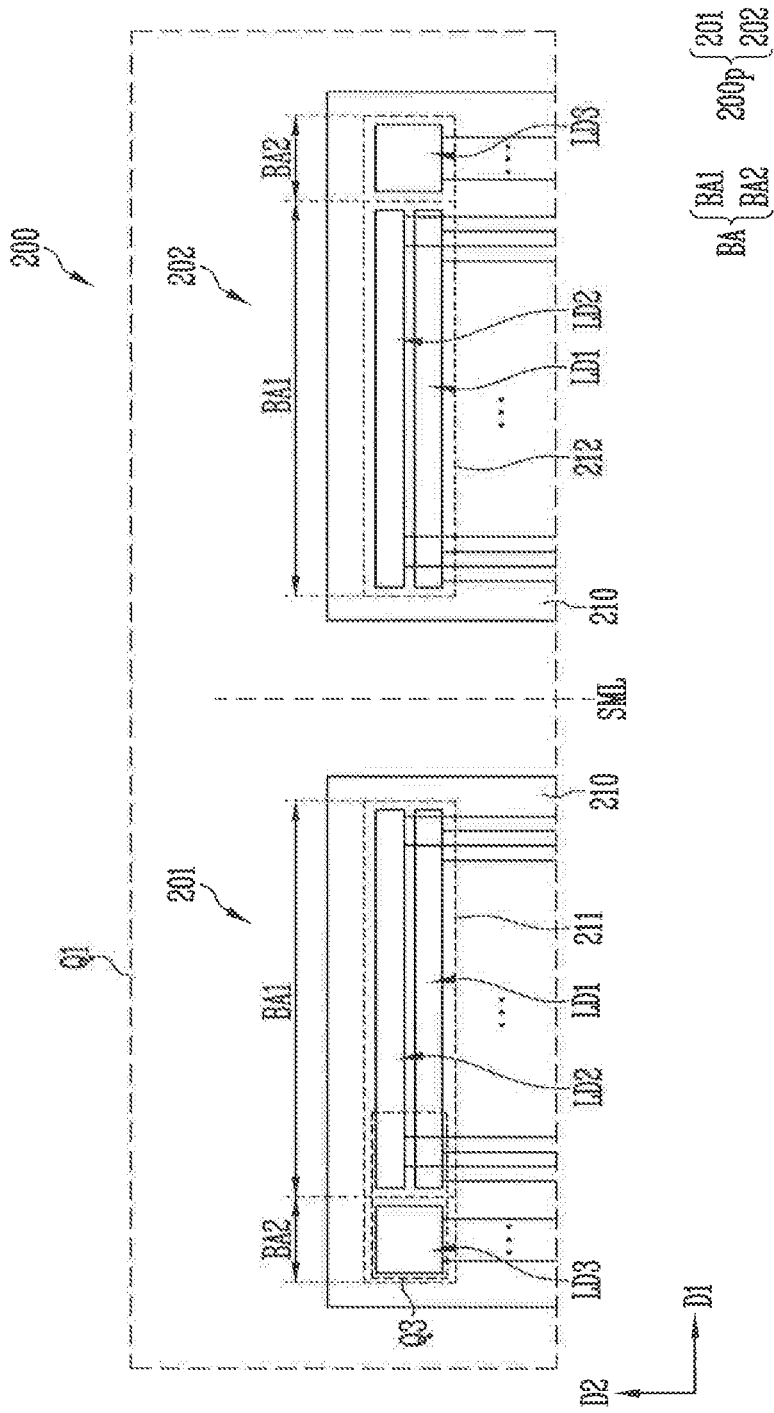
FIG. 7 is an enlarged plan view of a driving film in which the region Q1 in FIG. 4 is enlarged.

FIG. 7 is an enlarged plan view of the driving film in which the region Q1 in FIG. 4 is enlarged. FIG. 8 is an enlarged plan view of a region Q3 in FIG. 7. For example, FIG. 7 shows the first driving film portion 201 and the second driving film portion 202 of the driving film 200, and FIG. 8 shows a first data lead LD1, a second data lead LD2, and a signal lead LD3 of the first driving film portion 201.

Referring to FIGS. 3 to 8, the driving film 200 may be attached to one side of the first substrate 101 to correspond to the driving pad 110.

As described above, the driving film 200 may include the first driving film portion 201 and the second driving film portion 202. The first driving film portion 201 and the second driving film portion 202 may be alternately arranged along the first direction D1. The driving film 200 may include the plurality of film pairs 200p. One film pair 200p may include the first driving film portion 201 and the second driving film portion 202 which are sequentially arranged, and the plurality of film pairs 200p may be arranged in the first direction D1.

The first driving film portion 201 and the second driving film portion 202 may be symmetrical to each other with respect to the symmetry line SML. The symmetry line SML shown in FIG. 7 may be the same as the symmetry line SML shown in FIG. 5.

The first driving film portion 201 may include a first lead portion 211 and the second driving film portion 202 may include a second lead portion 212. The first lead portion 211 and the second lead portion 212 may be a plurality of wires formed on one surface of the flexible film 210.

The bonding region BA may be a region, on the first substrate 101, where the driving pad 110 and the driving film 200 are coupled to each other. The bonding region 3A may include the data region BA1 and the signal region BA2. In an exemplary embodiment of the present invention, the bonding region BA may include either the data region BA1 or the signal region BA2.

The first lead portion 211 and the second lead portion 212 may include a plurality of first data leads LD1, a plurality of second data leads LD2 and a plurality of signal leads LD3. The first data leads LD1 and the second data leads LD2 may overlap the data region BA1 and the signal leads LD3 may overlap the signal region BA2.

Figure 8:
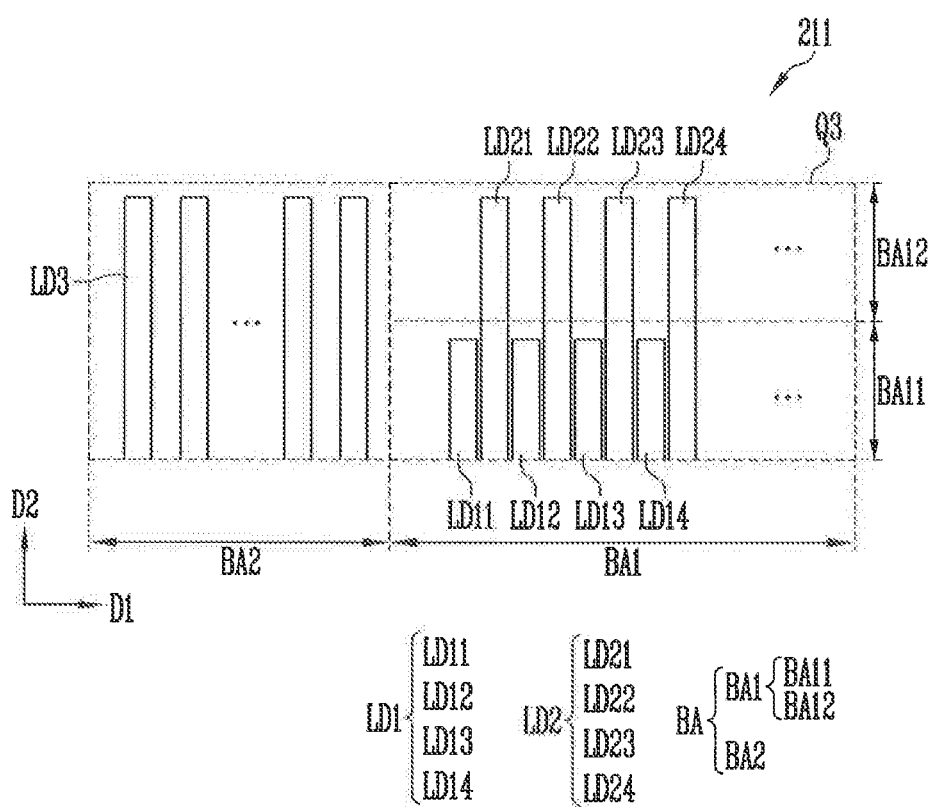
FIG. 8 is an enlarged plan view of a region Q3 in FIG. 7.

As shown in FIG. 8, each of the first data leads LD1 may include first, second, third and fourth leads LD11, LD12, LD13 and LD14, and the first, second, third and fourth leads LD11, LD12, LD13 and LD14 may be disposed on one surface of the flexible film 210 along the first direction D1. Each of the second data leads LD2 may include fifth, sixth, seventh and eighth leads LD21, LD22, LD23, and LD24, and the fifth, sixth, seventh and eighth leads LD21, LD22, LD23, and LD24 may be disposed on one surface of the flexible film 210 along the first direction D1. In addition, the first data leads LD1 and the second data leads LD2 may be alternately arranged along the first direction D1. For example, the fifth lead LD21 of the second data lead LD2 may be disposed between the first lead LD11 and the second lead LD12 of the first data lead LD1. For example, the lengths of each of the first, second, third and fourth leads LD11, LD12, LD13 and LD14 of the first data lead LD1 may have lengths in the second direction D2 that are less than those of the fifth, sixth, seventh and eighth leads LD21, LD22, LD23, and LD24 of the second data lead LD2.

The first data leads LD1, the second data leads LD2 and the signal leads LD3 may be wires extending in the second direction D2 with a substantially uniform width.

The data region BA1 may be divided into the first row data region BA11 and the second row data region BA12 along the second direction D2. The first data leads LD1 may overlap the first row data region BA11 of the data region BA1 and may not overlap the second row data region BA12. The second data leads LD2 may overlap both the first row data region BA11 and the second row data region BA12 of the data region BA1.

The signal leads LD3 may overlap the signal region BA2. The signal leads LD3 may be arranged along the first direction D1. The signal region BA2 may be adjacent to the data region BA1 in the first direction D1 or the opposite direction to the first direction D1.

Each of the first data leads LD1, the second data leads LD2 and the signal leads LD3 may be electrically coupled to the source driving circuit 220 and the driving pad 110. One end of each of the first data leads LD1, the second data leads LD2 and the signal leads LD3 may be coupled to the source driving circuit 220 and the other ends of the first data leads LD1, the second data leads LD2 and the signal leads LD3 may be coupled to the first data pads PA1, the second data pads PA2, and the signal pads PA3 of the driving pad 110, respectively.

The first data leads LD1, the second data leads LD2 and the signal leads LD3 may be supplied with the driving signals DATA and GATE and the driving power VRD, Vcom and Vcst from the source driving circuit 220, and may transmit the received driving signals and the received driving power to the driving pad 110.

The signals transmitted by the first data leads LD1, the second data leads LD2 and the signal leads LD3 may be different from each other. In an exemplary embodiment of the present invention, the first data leads LD1 and the second data leads LD2 may be provided with the data signal DATA from the source driving circuit 220. In addition, the first data leads LD1 and the second data leads LD2 may be coupled to the first data pads PA1 and the second data pads PA2, respectively, to transmit the data signal DATA. The signal leads LD3 may be provided with signals other than the data signal DATA from the source driving circuit 220. For example, the signal leads LD3 may be provided with the gate signal GATE and the various kinds of driving power VRD, Vcom and Vcst. The driving power provided to the signal leads LD3 may include at least one of the dividing reference voltage VRD, the storage voltage Vcst, or the common voltage Vcom. The signal leads LD3 may be electrically coupled to the signal pads PA3 to transmit various signals and voltages. The signals and voltages transmitted by the first data leads LD1, the second data leads LD2 and the signal leads LD3 are not limited to those described above, and other types of signals may be transmitted.

According to an exemplary embodiment of the present invention, only a part of the signal leads LD3 may transfer the gate signal GATE to the signal pads PA3. In an exemplary embodiment of the present invention, only the outermost driving film portion among the driving films 200 attached on the first substrate 101 may transmit the gate signal GATE. For example, the signal leads LD3 of the leftmost first driving film portion 201 among the driving films 200 and the signal leads LD3 of the rightmost second driving film portion 202 among the driving films 200 may transmit the gate signal GATE, and the other signal leads LD3, between the leftmost first driving film portion 201 and the rightmost second driving film portion 202, may transmit the driving power VRD, Vcom and Vcst other than the data signal DATA and the gate signal GATE.

As described above, the driving films 200 may be attached to one side of the first substrate 101, and the driving films 200 may include the plurality of first driving film portions 201 and the plurality of second driving film portions 202 alternately arranged. The first driving film portion 201 and the second driving film portion 202 may be symmetrical to each other, with respect to a symmetry line SML, and may constitute one film pair 200p. When the first driving film portion 201 and the second driving film portion 202 constitute the film pair 200p, the film pairs 200p of the driving films 200 may be attached to the pad pairs 110p of the driving pad 110 in a one-to-one correspondence.

The first driving film portion 201 may include the first lead portion 211 formed on the flexible film 210 and the second driving film portion 202 may include the second lead portion 212 formed on the flexible film 210.

Each of the first lead portion 211 and the second lead portion 212 may include the leads LD1, LD2 and LD3 arranged in the data region BA1 and the signal region BA2, and the leads LD1, LD2 and LD3 may receive different signals from the source driving circuit 220. For example, the first lead portion 211 may include the first data leads LD1 and the second data leads LD2 disposed in the data region BA1 to receive the data signal DATA, and the signal leads LD3 disposed in the signal region BA2 to receive various signals including the gate signal GATE, the dividing reference voltage VRD, the storage voltage Vcst, and the common voltage Vcom.

Each of the first data leads LD1, the second data leads LD2 and the signal leads LD3 may be coupled to the driving pad 110 to transmit signals and voltages provided to the driving films 200. The first data leads LD1 and the second data leads LD2 may be coupled to the first data pads PA1 and the second data pads PA2, respectively, to transmit the data signal DATA, and the signal leads LD3 may be coupled to the signal pads PA3 to transmit various signals including the gate signal GATE.

In a conventional display device, signal pads are formed on the left and right sides of a data pad. In contrast, the display device according to the present embodiment forms the signal region BA2 in only one of the left and right sides of the data region BA, so that the data pads PA1 and PA2 may be formed in a wider space. For example, the distance between the data pads PA1 and PA2 may be sufficiently secured. When the distance between the data pads PA1 and PA2 is not sufficiently secured, a short may be generated between the pads PA1, PA2 and PA3 and the leads LD1, LD2 and LD3 in an outer lead bonding (OLB) process for connecting the driving pad 110 and the driving films 200 to each other, and the display device may not be normally operated. For example, the distance between the data pads PA1 and PA2 may be secured to increase the reliability of the OLB process.

Conventionally, a film on which a first row data lead is formed and a film on which a second row data lead is formed are separately manufactured and attached to each other. In contrast, in this embodiment, the first data leads LD1 and the second data leads LD2 may be formed on one driving film 200 and coupled to the driving pad 110. Therefore, the number of driving films 200 connected to the driving pad 110 may be reduced, thereby reducing the manufacturing cost.

Hereinafter, the display device according to an exemplary embodiment of the present invention will be described. In the following description, components that may be the same as or similar to the components previously described may be referred to by the same reference numerals, and the description thereof may be omitted or simplified; thus, differences between the previously described embodiments and the present embodiment will be mainly described.

Figure 9:
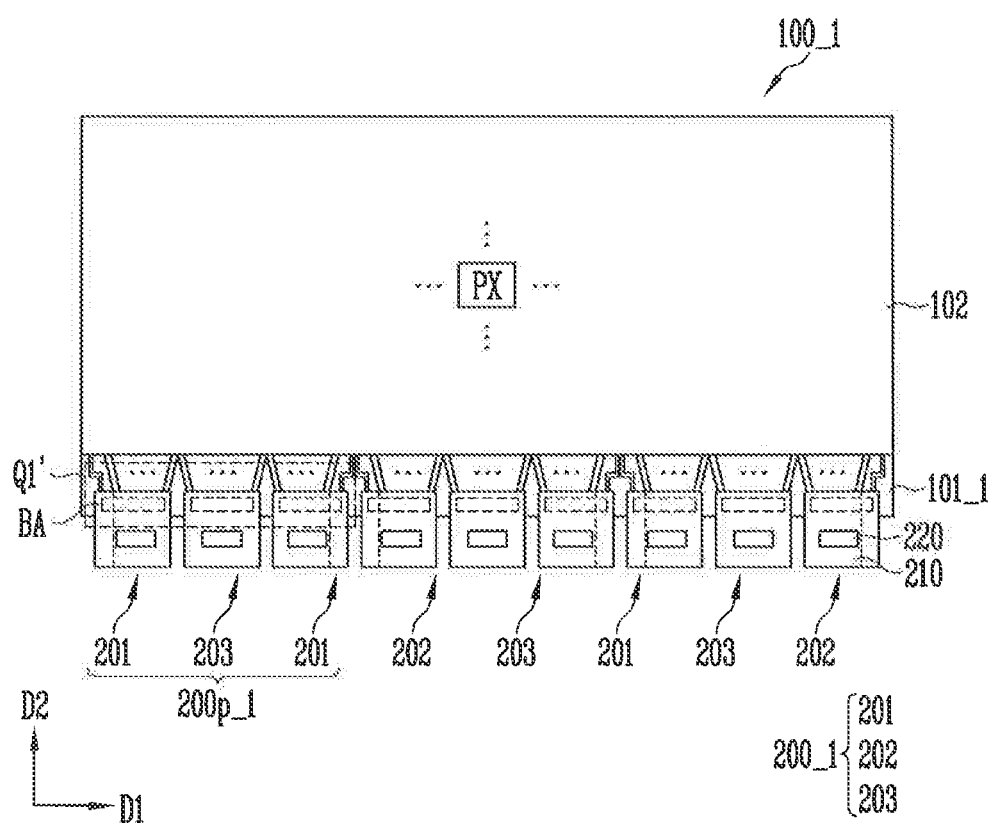
FIG. 9 is a plan view illustrating a display panel according to an exemplary embodiment of the present invention.
Figure 10:
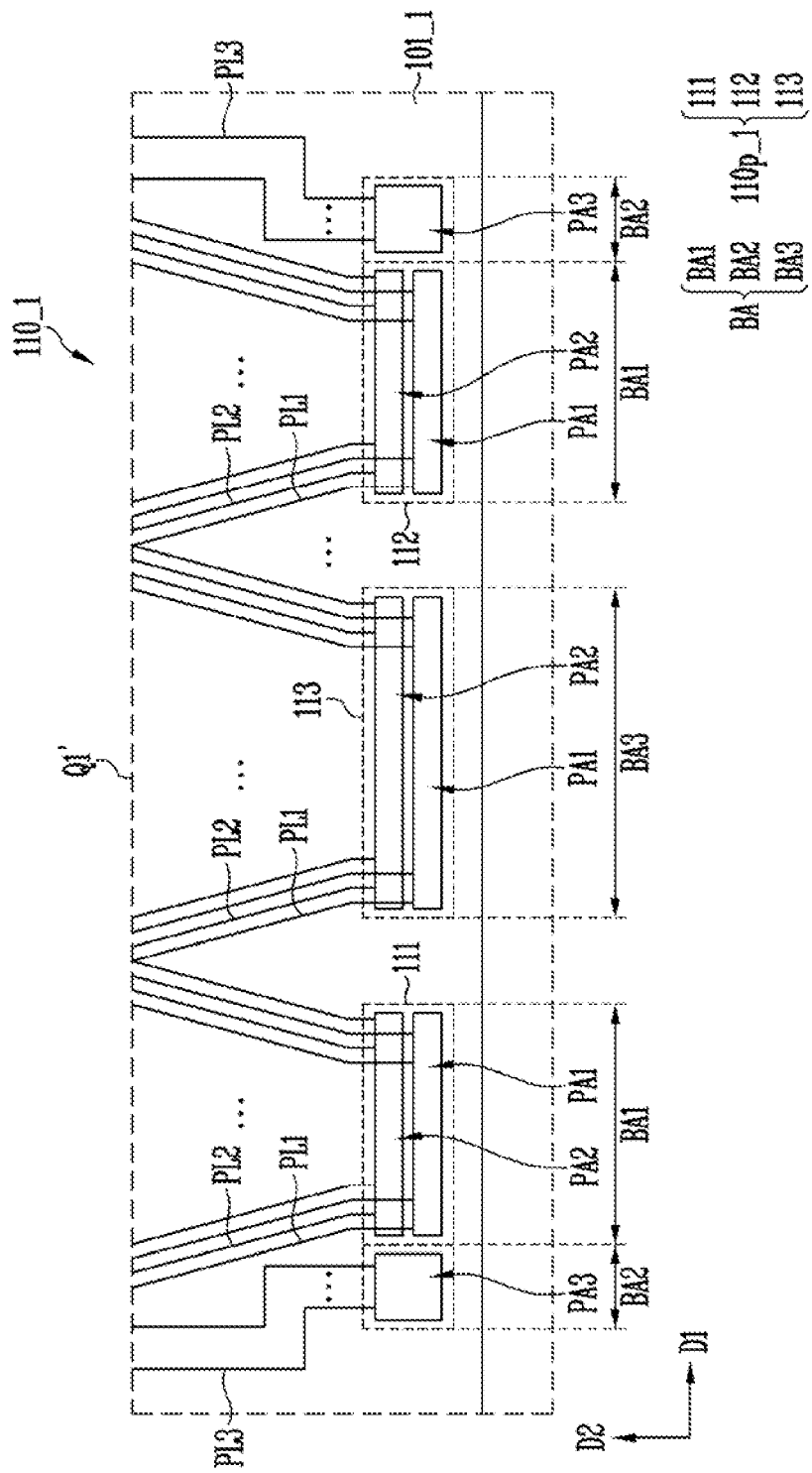
FIG. 10 is an enlarged plan view of the display panel in which a region Q1' of FIG. 9 is enlarged.
Figure 11:
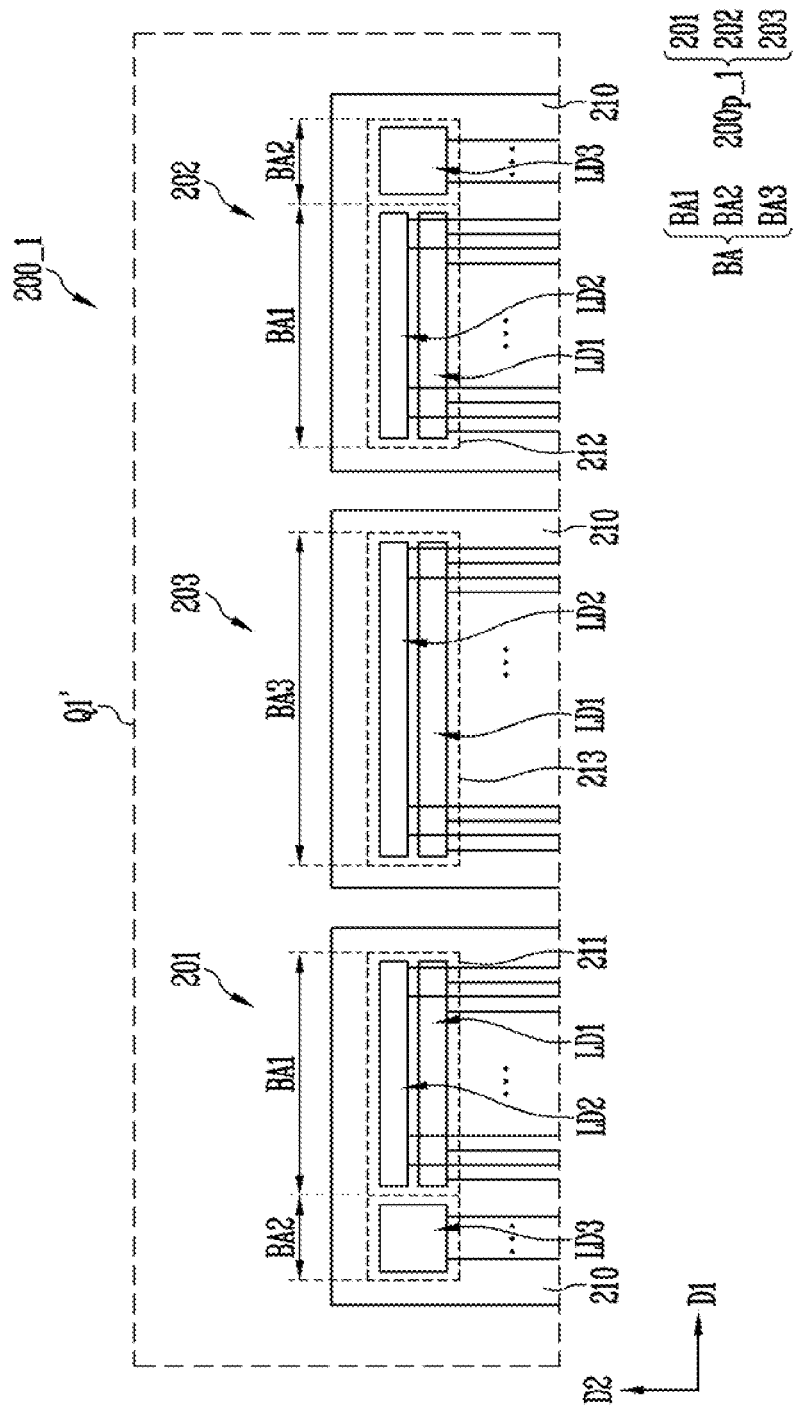
FIG. 11 is an enlarged plan view of a driving film in which the region Q1' of FIG. 9 is enlarged.

FIG. 9 is a plan view illustrating a display panel according to an exemplary embodiment of the present invention. FIG. 10 is an enlarged plan view of the display panel in which a region Q1' of FIG. 9 is enlarged. FIG. 11 is an enlarged plan view of a driving film in which the region Q1' of FIG. 9 is enlarged. For example, FIG. 10 illustrates the first pad portion 111, the second pad portion 112 and a third pad portion 113 of a first substrate 101_1, and FIG. 11 illustrates the first driving film portion 201, the second driving film portion 202, and a third driving film portion 203.

Unlike the embodiments shown in FIGS. 4 to 8, embodiments shown in FIGS. 9 to 11 may further include a third pad portion and a third driving film portion. The first, second and third pad portions may constitute one pad pair and the first, second and third driving film portions may constitute one film pair.

Referring to FIGS. 9 to 11, a display panel 100_1 may include the first substrate 101_1, the second substrate 102, and a driving film 200_1. The first substrate 101_1 may be electrically coupled to the driving film 200_1 through a driving pad 110_1 adjacent to one side of the first substrate 101_1 and provided along the first direction D1. The first substrate 101_1 may include the various signal lines PL1, PL2 and PL3 connected to the driving pad 110. The driving signals and the driving power may be provided to the pixels PX through the signal lines PL1, PL2 and PL3.

As shown in FIG. 10, the driving pad 110_1 may include the first pad portion 111, the second pad portion 112, and the third pad portion 113 disposed between the first pad portion 111 and the second pad portion 112. The areas of the first, second and third pad portions 111, 112, and 113 may be substantially the same.

The driving pad 110_1 may include a plurality of pad pairs 110p_1. One pad pair 110p_1 may include the first pad portion 111, the third pad portion 113 and the second pad portion 112 which are sequentially arranged. The plurality of pad pairs 110p_1 may be arranged along the first direction D1. For example, the driving pad 110_1 may include a plurality of pad portions 111, 112, and 113 arranged in the order of the first pad portion 111, the third pad portion 113, and the second pad portion 112.

Each of the first pad portion 111 and the second pad portion 112 may include the first data pads PA1, the second data pads PA2, and the signal pad PA3. The first data pads PA, the second data pads PA2 and the signal pad PA3 may be the same as or similar to the first data pads PA1, the second data pads PA2 and the signal pad PA3 described in the embodiments of FIGS. 4 to 8, and thus a detailed description thereof will be omitted.

The third pad portion 113 may be disposed in the bonding region BA. The third pad portion 113 may include the first data pads PA1 and the second data pads PA2. The third pad portion 113 may not include the signal pad PA3 unlike the first pad portion 111 and the second pad portion 112 described above. For example, a region where the third pad portion 113 is disposed may be a data region BA3 for transmitting the data signal DATA.

The first data pads PA1 of the third pad portion 113 may be coupled to the first signal lines PL1 to provide the transmitted data signal DATA to the pixels PX, and the second data pads PA2 may be coupled to the second signal lines PL2 to provide the data signal DATA to the pixels PX.

As shown in FIG. 11, the driving film 200_1 may include the first driving film portion 201, the second driving film portion 202, and the third driving film portion 203 disposed between the first driving film portion 201 and the second driving film portion 202.

The driving film 200_1 may include a plurality of film pairs 200p_1. One film pair 200p_1 may include the first driving film portion 201, the third driving film portion 203, and the second driving film portion 202 which are sequentially arranged. The plurality of film pairs 200p_1 may be arranged along the first direction D1. For example, the driving film 200_1 may include a plurality of driving film portions 201, 202, and 203 arranged in the order of the first driving film portion 201, the third driving film portion 203, and the second driving film portion 202.

The first driving film portion 201 may include the first lead portion 211, and the second driving film portion 202 may include the second lead portion 212. The first lead portion 211 and the second lead portion 212 may be a plurality of wires formed on one surface of the flexible film 210. Each of the first lead portion 211 and the second lead portion 212 may include the first data leads LD1, the second data leads LD2, and the signal lead LD3. The first data leads LD1, the second data leads LD2 and the signal lead LD3 are the same as or similar to the first data leads LD1, the second data lead LD2 and the signal lead LD3 as described in embodiments of FIGS. 4 to 8, and thus a detailed description thereof will be omitted.

The third driving film portion 203 may be formed on one surface of the flexible film 210 and may include a third lead portion 213 disposed between the first lead portion 211 and the second lead portion 212. The third lead portion 213 may be disposed in the bonding region BA.

The third lead portion 213 may include the first data leads LD1 and the second data leads LD2 and may not include the signal lead LD3 unlike the first lead portion 211 and the second lead portion 212 described above. For example, a region where the third lead portion 213 of the third driving film portion 203 is disposed may be the data region BA3 for transmitting the data signal DATA.

Each of the first data leads LD1 and the second data leads LD2 of the third driving film portion 203 may be electrically coupled to the source driving circuit 220 and the driving pad 110. For example, one end of each of the first data leads LD1 and the second data leads LD2 may be coupled to the source driving circuit 220 and the other ends of the first data leads LD1 and the second data leads LD2 may be coupled to the first data pads PA1 and the second data pads PA2 of the driving pad 110, respectively.

The first data leads LD1 and the second data leads LD2 of the third driving film portion 203 may receive the data signal DATA from the source driving circuit 220 and transmit the data signal DATA to the driving pad 110.

In the embodiment described with reference to FIGS. 9 to 11, one pad pair 110p_1 may include one third pad portion 113, and one film pair 200p_1 may include one third lead portion 213. However, the present invention is not limited thereto. One pad pair 110p_1 may include a plurality of third pad portions (113) and one film pair 200p_1 may include a plurality of third lead portions (213).

The display device according to an exemplary embodiment of the present invention may include the third pad portion 113 on which no signal pad PA3 is formed. For example, the third pad portion 113 may include more data pads PA1 and PA2 within the same area than the first pad portion 111 and the second pad portion 112.

Figure 12:
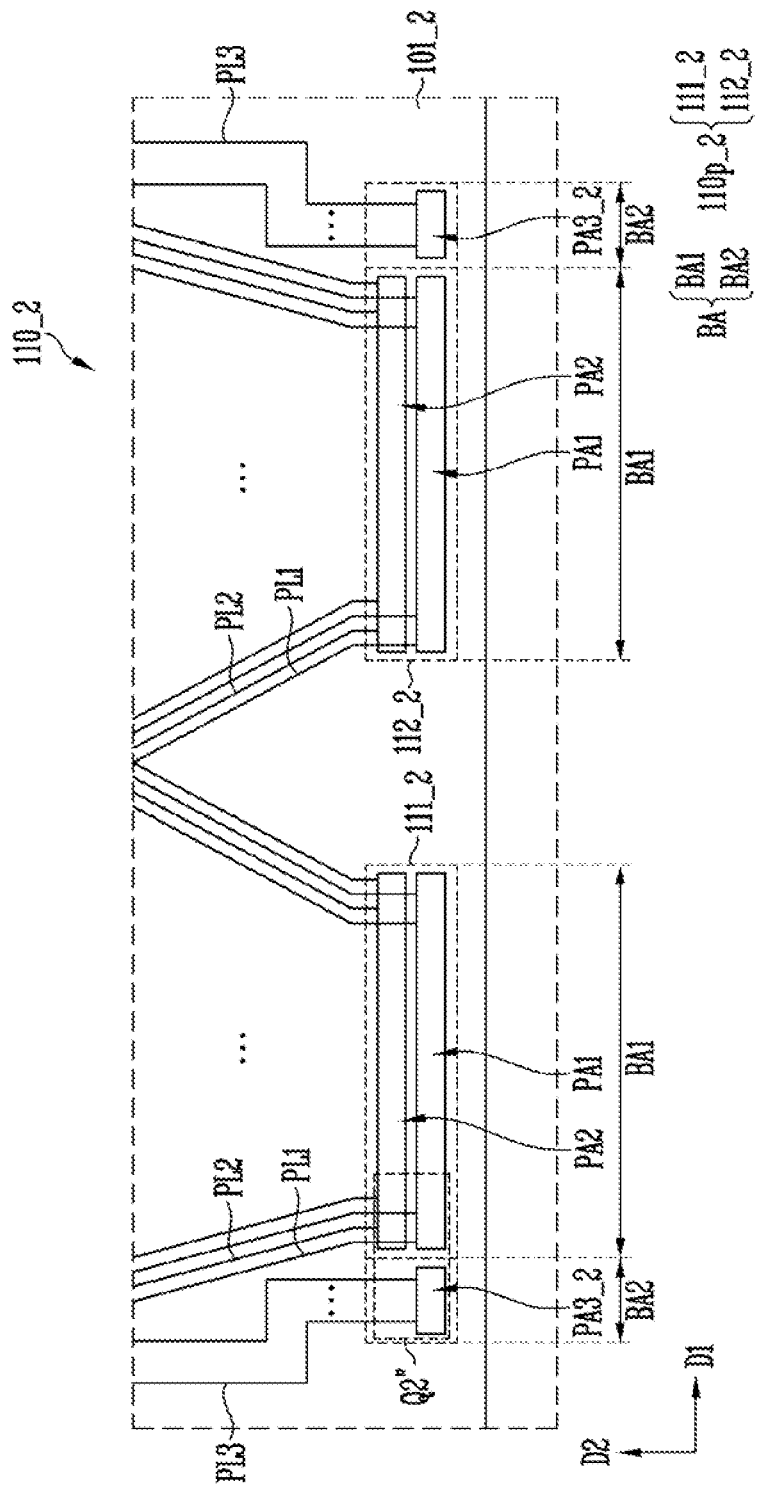
FIG. 12 is an enlarged plan view of the display panel according to an exemplary embodiment of the present invention.
Figure 13:
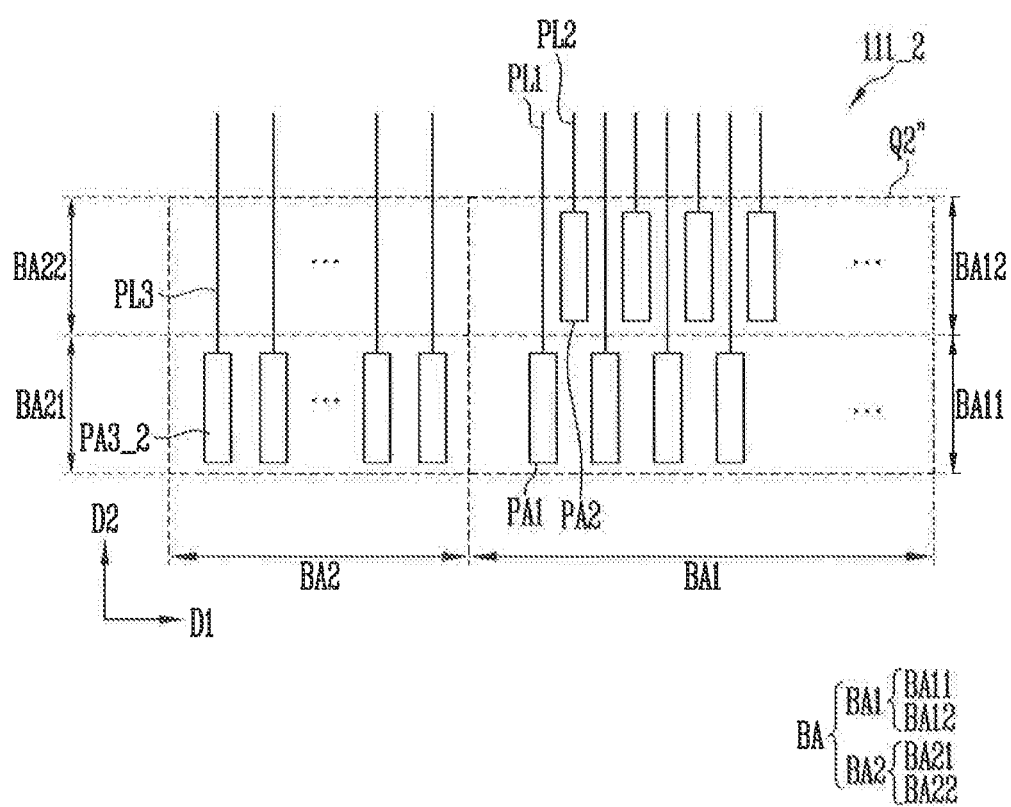
FIG. 13 is an enlarged plan view of a region Q2" in FIG. 12.
Figure 14:
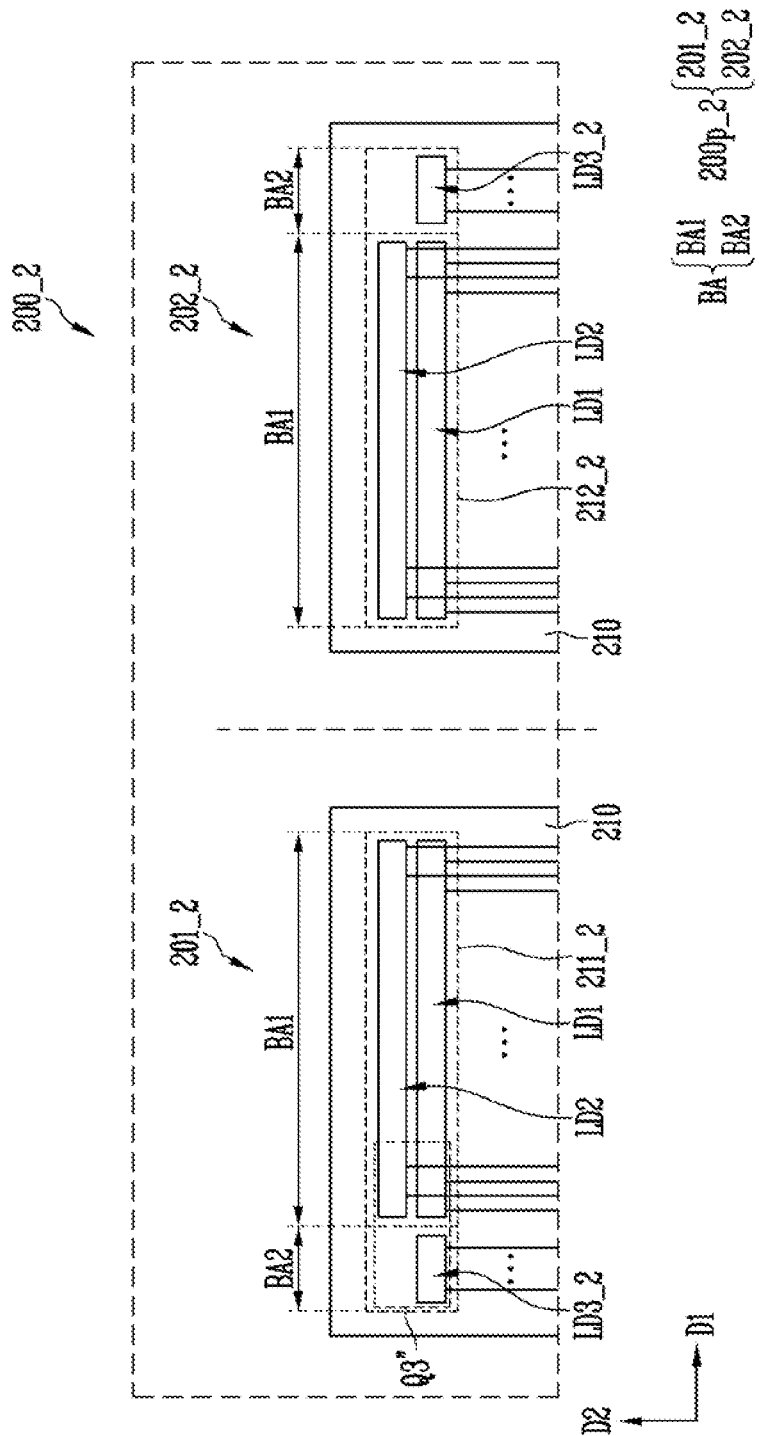
FIG. 14 is an enlarged plan view of a driving film of a display panel according to an exemplary embodiment of the present invention.
Figure 15:
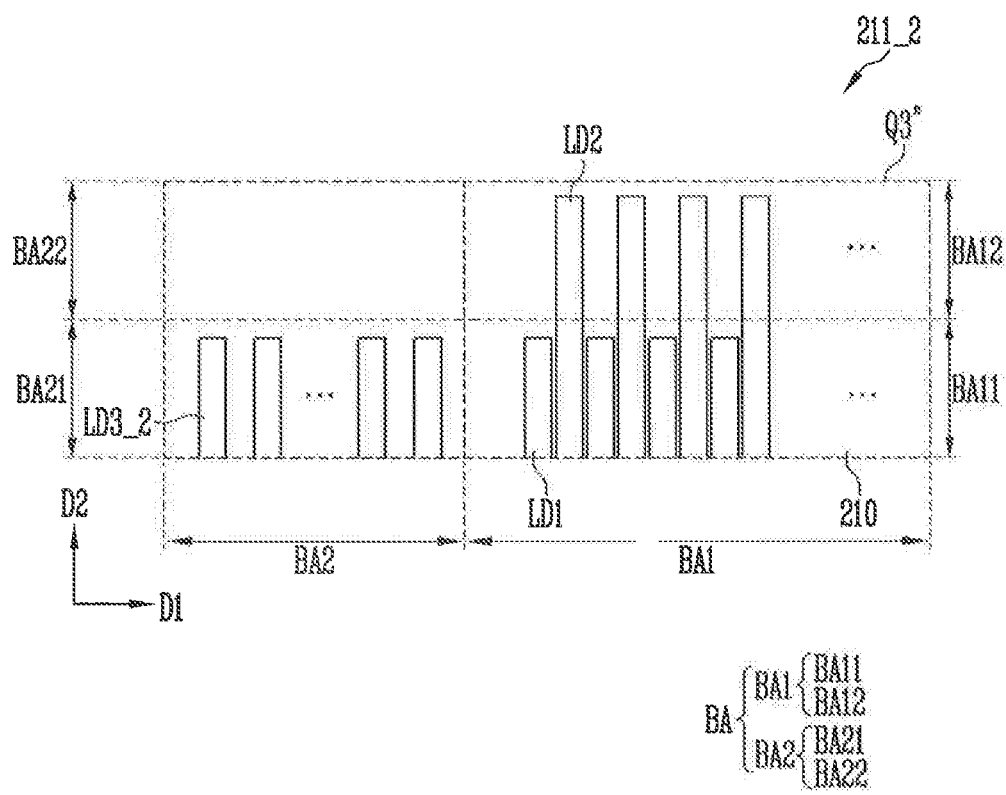
FIG. 15 is an enlarged plan view of a region Q3" in FIG. 14.

FIG. 12 is an enlarged plan view of a display panel according to an exemplary embodiment of the present invention. FIG. 13 is an enlarged plan view of a region Q2" in FIG. 12. FIG. 14 is an enlarged plan view of a driving film of a display panel according to an exemplary embodiment of the present invention. FIG. 15 is an enlarged plan view of a region Q3" in FIG. 14.

The embodiment of FIGS. 12 to 15 differs from the embodiment of FIGS. 4 to 8 in that the third pad of the signal region overlaps the first pad in the first direction and does not overlap the second pad in the first direction. Differences between the embodiments are explained below.

Referring to FIGS. 12 to 15, a first substrate 1012 may be electrically coupled to a driving film 200_2 through a driving pad 1102 adjacent to one side of the first substrate 101_2 and provided along the first direction D1.

The driving pad 1102 may include a first pad portion 111_2 and a second pad portion 112_2 formed in the bonding region BA. The first pad portion 111_2 and the second pad portion 112_2 may include the first data pads PA1, the second data pads PA2 and the signal pads PA3_2. The first and second data pads PA1 and PA2 are disposed in the data region BA1, and the signal pads PA3_2 are disposed in the signal region BA2.

Unlike the signal pad PA3 according to the embodiment of FIGS. 5 and 6, the signal pads PA3_2 according to the embodiment of FIGS. 12 and 13 may not be overlapped by the second data pad PA2 in the first direction D1. For example, the signal region BA2 may be divided into a first row signal region BA21 and a second row signal region BA22 along the second direction D2. The signal pads PA3_2 may be disposed in the first row signal region BA21 of the signal region BA2 and may not be disposed in the second row signal region BA22.

The driving film 200_2 may include a first driving film portion 201_2 and a second driving film portion 202_2. The first driving film portion 201_2 and the second driving film portion 202_2 may respectively include a first lead portion 211_2 and a second lead portion 212_2 formed on one surface of the flexible film 210. Each of the first lead portion 211_2 and the second lead portion 212_2 may include the first data leads LD1, the second data leads LD2 and the signal leads LD3_2. The first data leads LD1 and the second data leads LD2 may be disposed in the data region BA, and the signal leads LD3_2 may be disposed in the signal region BA2.

Unlike the signal leads LD3 according to the embodiment of FIGS. 7 and 8, the signal leads LD3_2 according to the embodiment of FIGS. 14 and 15 may not be overlapped by the second data leads LD2 in the first direction D1. For example, the signal region BA2 may be divided into the first row signal region BA21 and the second row signal region BA22 along the second direction D2. The signal leads LD3_2 may be disposed in the first row signal region BA21 of the signal region BA2 and may not be disposed in the second row signal region BA22.

When the signal pad PA3_2 is disposed only in the first row signal region BA21 of the bonding region BA and is not disposed in the second row signal region BA22 as in the embodiment of FIGS. 12 to 15, the space in which the third signal line PL3 is to be disposed may be sufficiently provided.

For example, as shown in FIG. 13, the leftmost signal pad PA3_2 may receive the gate signal GATE from the driving film 200_2 and provide the received gate signal GATE to each pixel PX. The third signal lines PL3 for transmitting the gate signal GATE are formed closer to the edge side of the first substrate 101_2 by using the space of the second row signal region BA22 in which the signal pad PA3_2 is not formed, so that the size of the bezel of the display device can be reduced.

In addition, the contact area between the signal pads PA3_2 and the signal leads LD3_2 can be reduced, and the resistance caused thereby can be reduced. For example, the heat generated by the wiring resistance in the display device can be reduced.

Figure 16:
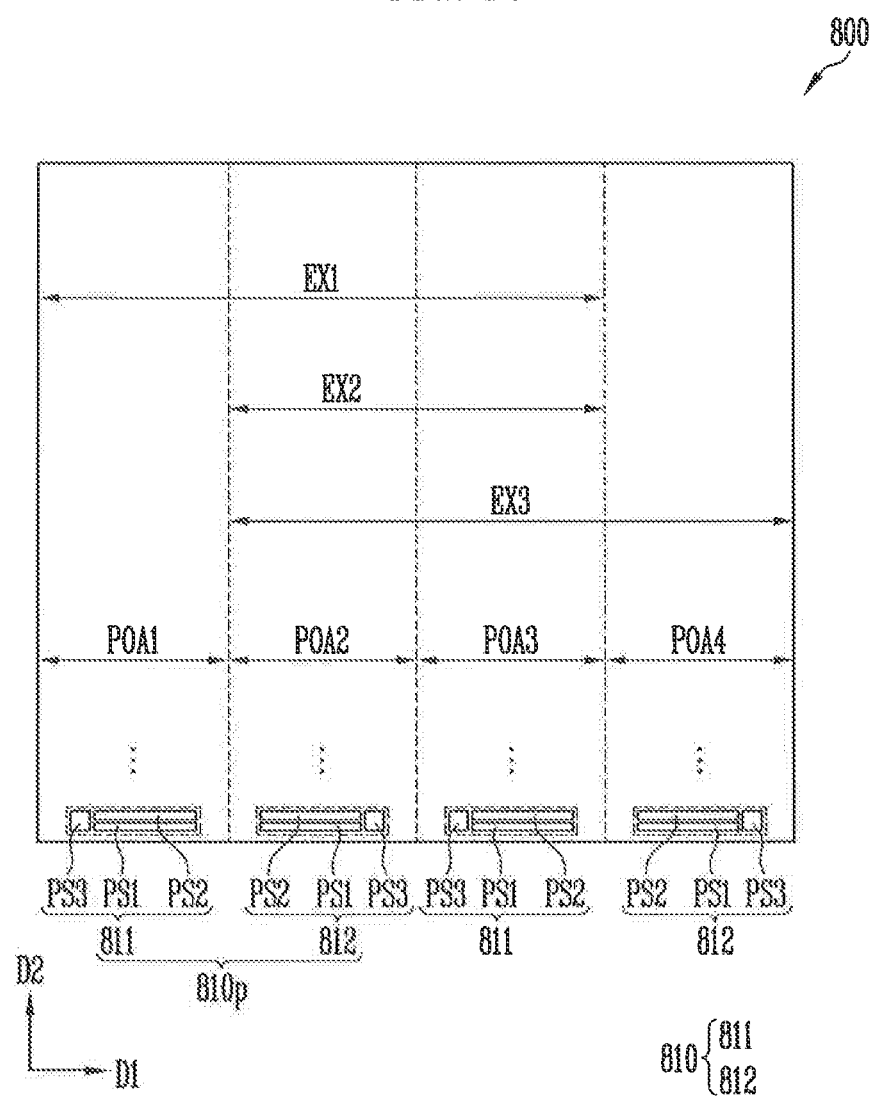
FIG. 16 is a plan view of an exposure mask for manufacturing the display device according to an exemplary embodiment of the present invention.

FIG. 16 is a plan view of an exposure mask for manufacturing the display device according to an exemplary embodiment of the present invention. For example, exposure mask shown in FIG. 16 may be an exposure mask for forming the first substrate 101 of FIGS. 4 to 6. A duplicate description will be omitted.

Referring to FIGS. 4, 5, 6 and 16, an exposure mask 800 may include a first pad open region POA1, a second pad open region POA2, a third pad open region POA3, and a fourth pad open region POA4 arranged in sequence. The exposure mask 800 may include a pad slit portion 810 formed adjacent to one side thereof. The pad slit portion 810 may be formed in each of the pad open regions POA1, POA2, POA3, and POA4. The pad slit portion 810 may be an exposure slit for forming the driving pad 110 on the substrate 101 shown in FIG. 5.

Each of the first pad open region POA1 and the third pad open region POA3 may include a first pad slit portion 811. The first pad slit portion 811 may be a slit for forming the first pad portion 111. For example, the first pad slit portion 811 may include pad slits PS1, PS2, and PS3 corresponding to the shape of the first pad portion 111. The pad slits PS1, PS2, and PS3 may include a plurality of slits corresponding to the shape of the pads.

For example, the first pad slit portion 811 may include the first data pad slit PS1, the second data pad slit PS2, and the signal pad slit PS3. The first data pad slit PS1 of the first pad slit portion 811 may form the first data pad PA1 of the first pad portion 111. The second data pad slit PS2 may form the second data pad PA2 of the first pad portion 111. The signal pad slit PS3 may form the signal pad PA3 of the first pad portion 111.

Similar to the first pad portion 111, the signal pad slit PS3 of the first pad slit portion 811 may be formed on either the left or right side of the first data pad slit PS1 and the second data pad slit PS2. For example, as shown in FIG. 16, the signal pad slit PS3 may be formed on the left side of the first data pad slit PS1 and the second data pad slit PS2.

Each of the second pad open region POA2 and the fourth pad open region POA4 may include a second pad slit portion 812. The second pad slit portion 812 may be a slit for forming the second pad portion 112. For example, the second pad slit portion 812 may include the pad slits PS1, PS2, and PS3 corresponding to the shape of the second pad portion 112. The pad slits PS1, PS2, and PS3 may include a plurality of slits corresponding to the shape of the pads.

For example, the second pad slit portion 812 may include the first data pad slit PS1, the second data pad slit PS2, and the signal pad slit PS3. The first data pad slit PS1 of the second pad slit portion 812 may form the first data pad PA1 of the second pad portion 112. The second data pad slit PS2 may form the second data pad PA2 of the second pad portion 112. The signal pad slit PS3 may form the signal pad PA3 of the second pad portion 112.

Similar to the second pad portion 112, the signal pad slit PS3 of the second pad slit portion 812 may be formed on either the left or right side of the first data pad slit PS1 and the second data pad slit PS2. For example, as shown in FIG. 16, the signal pad slit PS3 may be formed on the right side of the first data pad slit PS1 and the second data pad slit PS2.

One first pad slit portion 811 and one second pad slit portion 812 adjacent thereto may form one slit pair 810$p$. For example, the pad slit portion 810 may include a plurality of slit pairs (810$p$).

The signal pad slit PS3 of the outermost pad slit (811 or 812) of the pad slit portion 810 formed in the exposure mask 800 may include a gate pad slit for providing the gate signal GATE (see FIG. 3) to the pixels PX of the display device. For example, each of the signal pad slit PS3 of the first pad slit portion 811 formed in the first pad open region POA1 and the signal pad slit PS3 of the second pad slit portion 812 formed in the fourth pad open region POA4 may include a gate pad slit for forming a pad that transmits the gate signal.

In an exemplary embodiment of the present invention, the exposure mask 800 may further include slits connected to the first data pad slit PS1, the second data pad slit PS2, and the signal pad slit PS3 to form the signal lines PL1, PL2, and PL3 on the first substrate 101. For example, the exposure mask 800 may simultaneously form the driving pad 110 and the signal lines PL1, PL2, and PL3. However, the present invention is not limited thereto. In an exemplary embodiment of the present invention, the signal lines PL1, PL2, and PL3 may be formed in separate processes using separate exposure masks.

A photosensitive material may be coated on the first substrate 101. The above-described exposure mask 800 may be disposed on the first substrate 101 and an exposure process may be performed. The driving pad 110 may be formed on the first substrate 101 by the light passing through the slits of the exposure mask 800.

When the size of the exposure mask 800 is smaller than the size of the first substrate 101, the driving pad 110 disposed on the first substrate 101 may not be formed by a single exposure process. For example, the full-size driving pad 110 may be formed by a plurality of exposure processes.

A method of manufacturing the display device including the first substrate 101 on which the driving pad 110 is formed using the exposure mask 800 according to the present embodiment may include steps of exposing a first exposure region EX1 to perform a first exposure process, exposing a second exposure region EX2 to perform a second exposure process, and exposing a third exposure region EX3 to perform a third exposure process.

The first exposure region EX1 may include the first pad open region POA1. For example, the first exposure region EX1 may include the first pad open region POA1, which is the leftmost region among the pad open regions POA1, POA2, POA3, and POA4, including the pad slit portion 810. In addition, the first exposure region EX1 may further include the second pad open region POA2 and the third pad open region POA3 adjacent to the second pad open region POA2. The first exposure region EX1 may include an odd number of pad open regions POA1, POA2 and POA3. However, the present invention is not limited thereto.

The first pad portion 111, the second pad portion 112 and the first pad portion 111 may be sequentially formed on the first substrate 101 by exposing the first exposure region EX1 and performing the first exposure process.

The second exposure region EX2 may not include the first pad open region POA1, which is located at the leftmost side of the exposure mask 800, and the fourth pad open region POA4, which is located at the rightmost side of the exposure mask 800. For example, the second exposure region EX2 may include the second pad open region POA2 and the third pad open region POA3. The second exposure region EX2 may include an even number of pad open regions POA2 and POA3. However, the present invention is not limited thereto.

When the second exposure region EX2 is exposed and the second exposure process is performed, the positions of the exposure mask 800 and the first substrate 101 may be adjusted so that the pad portions Il1 and 112 may be formed on the right side of the first pad portion 111 formed by the first exposure process. For example, the first pad portion 111 and the second pad portion 112 may be sequentially formed on the first substrate 101 by the first exposure process, and the second pad portion 112 and the first pad portion 111 may be sequentially formed on the right side of the first pad portion 111 by the second exposure process.

The second exposure process for exposing the second exposure region EX2 may be performed a plurality of times. For example, if the second exposure process is performed again from the right side of the pad portions 111 and 112 formed by the second exposure process, the number of pad portions 111 and 112 formed on the first substrate 101 may be increased. The number of times of the second exposure process may be adjusted according to the size of the display panel 100.

For example, the second exposure region EX2 may be included in each of the first exposure region EX1 and the third exposure region EX3. However, the present invention is not limited thereto.

The third exposure region EX3 may include the fourth pad open region POA4. For example, the third exposure region EX3 may include the fourth pad open region POA4 which is the rightmost region among the pad open regions POA1, POA2, POA3 and POA4 including the pad slit portion 810. In addition, the third exposure region EX3 may further include the second pad open region POA2 and the third pad open region POA3 adjacent to the fourth pad open region POA4. The third exposure region EX3 may include an odd number of pad open regions POA1, POA2 and POA3. However, the present invention is not limited thereto.

When the third exposure region EX3 is exposed and the third exposure process is performed, the positions of the exposure mask 800 and the first substrate 101 may be adjusted so that the pad portions may be formed on the right side of the pad portions 111 and 112 formed by the second exposure process. For example, pad portions 111 and 112 may be sequentially formed on the first substrate 101 by the first exposure process, pad portions 111 and 112 may be formed by the second exposure process on the right side of the first pad portion 111 formed by the first exposure process, and pad portions 111 and 112 may be formed by the third exposure process on the right side of the pad portions 111 and 112 formed by the first and second exposure processes. In an additional example, the first pad portion 111, the second pad portion 112, and another first pad portion 111 may be sequentially formed by the third exposure process.

A display device and a method of manufacturing the same according to the present invention may form signal pads for providing signals, other than a data signal, only on the left or right side of data pads. The distance between the data pads can be sufficiently secured and the reliability of an outer lead bonding (OLB) process between a pad portion of a display panel and a chip on film (COF) film can be increased.

In addition, according to the display device and the method of manufacturing the same of the present invention, data leads formed on one COF film may be coupled to a two-row pad structure formed on the display panel. The number of films necessary for connecting the pads can be reduced, and manufacturing costs can be reduced.

Effects according to the exemplary embodiments of the present invention are not limited by the contents exemplified above, and more various effects may be included in the specification.

While the present invention has been particularly shown and described with reference to exemplary embodiments thereof, it will be apparent to those of ordinary skill in the art that various changes in form and detail may be made thereto without departing from the spirit and scope of the present invention.

What is claimed is:

1. A display device comprising:
   a first substrate including a plurality of pixels; and
   a driving pad disposed on the first substrate,
   wherein the driving pad includes a first pad portion and a second pad portion alternately arranged along a first direction,
   wherein each of the first pad portion and the second pad portion includes first data pads and signal pads,
   wherein the first data pads of the first and second pad portions include a first side and a second side different from the first side,
   wherein the signal pads of the first pad portion are disposed on the first side of the first data pads of the first pad portion, and the signal pads of the second pad portion are disposed on the second side of the first data pads of the second pad portion,
   wherein the first data pads provide a data signal to the plurality of pixels, and the signal pads provide a driving voltage to the plurality of pixels,
   wherein a first end of each of the first data pads of the first and second pad portions is connected to a signal line, and a second end opposite to the first end of each of the first data pads of the first pad portion is not electrically connected to the first data pads of the second pad portion, and wherein the first pad portion and the second pad portion form one pad pair, a shape of the first pad portion and a shape of the second pad portion are symmetrical to each other with respect to a line extending in a second direction intersecting the first direction therebetween, and the driving pad comprises a plurality of pad pairs arranged along the first direction.

2. The display device of claim 1, wherein a plurality of bonding regions are provided in the first substrate, wherein the driving pad is disposed on the plurality of bonding regions, wherein each of the plurality of bonding regions includes a data region and a signal region, wherein the signal pads are arranged in the signal region, wherein the first data pads are arranged in the data region, and wherein an area of the data region is lamer than that of the signal region.

3. The display device of claim 2, wherein each of the first pad portion and the second pad portion further includes second data pads, wherein the data region includes a first row data region and a second row data region arranged along the second direction, and wherein the first data pads are arranged in the first row data region, and the second data pads are arranged in the second row data region.

4. The display device of claim 3, wherein the signal pads of the first pad portion or the signal pads of the second pad portion provide a gate signal to the plurality of pixels.

5. The display device of claim 4, wherein the driving voltage is at least one of a common voltage, a storage voltage, or a dividing reference voltage.

6. The display device of claim 4, further comprising:
a driving film electrically coupled to the driving pad,
wherein the driving film includes a flexible film and a source driving circuit disposed on the flexible film.

7. The display device of claim 6, wherein the driving film includes a first driving film portion and a second driving film portion alternately arranged along the first direction, and wherein the first driving film portion is coupled to the first pad portion and the second driving film portion is coupled to the second pad portion.

8. The display device of claim 7, wherein the first driving film portion includes a first lead portion, and the second driving film portion includes a second lead portion, wherein each of the first lead portion and the second lead portion includes first data leads and signal leads, wherein the first data leads of the first and second lead portions include a first side and a second side different from the first side, and wherein the signal leads of the first lead portion are disposed on only the first side of the first data leads of the first lead portion, and the signal leads of the second lead portion are disposed on only the second side of the first data leads of the second lead portion.

9. The display device of claim 8, wherein the first data pads are electrically coupled to the first data leads to receive the data signal, and the signal pads are electrically coupled to the signal leads to receive the driving voltage.

10. The display device of claim 9, wherein the signal leads of the first driving film portion or the signal leads of the second driving film portion receive the gate signal from the source driving circuit.

11. The display device of claim 3, wherein the driving pad further includes a third pad portion disposed between the first pad portion and the second pad portion, and wherein the first pad portion, the second pad portion, and the third pad portion form one pad pair.

12. The display device of claim 11, wherein the third pad portion includes the first data pads and does not include the signal pads.

13. The display device of claim 12, wherein the third pad portion further includes the second data pads disposed in the second row data region.

14. The display device of claim 3, further comprising:
a second substrate facing the first substrate; and
a liquid crystal layer disposed between the first substrate and the second substrate.

15. The display device of claim 3, wherein the signal region includes a first row signal region and a second row signal region arranged along the second direction, wherein the first row signal region overlaps the first row data region in the first direction, and the second row signal region overlaps the second row data region in the first direction, and wherein the signal pads are disposed in the first row signal region and are not disposed in the second row signal region.

* * * * *